US007980948B2

(12) United States Patent
Rowe et al.

(10) Patent No.: US 7,980,948 B2
(45) Date of Patent: Jul. 19, 2011

(54) DYNAMIC SIDE WAGERING SYSTEM FOR USE WITH ELECTRONIC GAMING DEVICES

(75) Inventors: Richard E. Rowe, Las Vegas, NV (US); Richard J. Schneider, Las Vegas, NV (US); Darryll Pleasant, Las Vegas, NV (US)

(73) Assignee: IGT, Reno, NV (US)

( * ) Notice: Subject to any disclaimer, the term of this patent is extended or adjusted under 35 U.S.C. 154(b) by 1218 days.

(21) Appl. No.: 11/642,410

(22) Filed: Dec. 19, 2006

(65) Prior Publication Data

US 2008/0146344 A1 Jun. 19, 2008

(51) Int. Cl.
*A63F 9/24* (2006.01)
*A63F 13/00* (2006.01)
*G06F 17/00* (2006.01)
*G06F 19/00* (2006.01)

(52) U.S. Cl. ................. 463/29; 463/20; 463/25; 463/42

(58) Field of Classification Search .................... 463/20, 463/25, 29, 42

See application file for complete search history.

(56) References Cited

U.S. PATENT DOCUMENTS 5,248,142 A * 9/1993 Breeding .................. 273/138.1
5,288,081 A 2/1994 Breeding
5,472,194 A 12/1995 Breeding et al.
5,544,892 A 8/1996 Breeding
5,788,574 A * 8/1998 Ornstein et al. ................ 463/25
5,839,730 A 11/1998 Pike
6,019,374 A 2/2000 Breeding
6,056,641 A 5/2000 Webb
6,149,522 A 11/2000 Alcorn et al.
6,264,561 B1 7/2001 Saffari
6,336,857 B1 1/2002 McBride
6,394,907 B1 5/2002 Rowe
6,517,073 B1 2/2003 Vancura
6,607,195 B2 8/2003 Vancura
6,685,567 B2 2/2004 Cockerille et al.
6,789,801 B2 9/2004 Snow
6,804,763 B1 10/2004 Stockdale et al.
6,863,608 B1 3/2005 LeMay et al.
6,866,586 B2 3/2005 Oberberger et al.
7,503,849 B2 * 3/2009 Hornik et al. .................. 463/20
2002/0094869 A1 * 7/2002 Harkham ........................ 463/42

(Continued)

FOREIGN PATENT DOCUMENTS

GB 2 403 429 5/2005

(Continued)

OTHER PUBLICATIONS

International Search Report and Written Opinion, PCT/US2007/087788, mailed Nov. 6, 2008.

*Primary Examiner* — David L Lewis
*Assistant Examiner* — Adetokunbo Torimiro
(74) *Attorney, Agent, or Firm* — Weaver Austin Villeneuve & Sampson LLP

(57) ABSTRACT

A technique is disclosed for facilitating side wagering activities conducted at a casino which includes a casino gaming network and a plurality of gaming machines. In at least one embodiment, a casino side wagering system may be utilized to enable casinos operators to provide side wagering opportunities to non-primary players of electronic gaming machines, electronic slot machines and/or other types of gaming machines.

36 Claims, 8 Drawing Sheets

U.S. PATENT DOCUMENTS

| | | | | |
|---|---|---|---|---|
| 2003/0073497 | A1 | 4/2003 | Nelson | |
| 2003/0203756 | A1 | 10/2003 | Jackson | |
| 2004/0002379 | A1 | 1/2004 | Parrott et al. | |
| 2004/0070146 | A1 | 4/2004 | Snow | |
| 2004/0084843 | A1 | 5/2004 | Snow | |
| 2004/0090003 | A1 | 5/2004 | Snow | |
| 2004/0090005 | A1 | 5/2004 | Snow | |
| 2004/0147314 | A1 | 7/2004 | LeMay et al. | |
| 2005/0003886 | A1 * | 1/2005 | Englman et al. | 463/25 |
| 2005/0192099 | A1 | 9/2005 | Nguyen et al. | |
| 2006/0040733 | A1 | 2/2006 | Baerlocher et al. | |
| 2006/0073882 | A1 | 4/2006 | Rozkin et al. | |

FOREIGN PATENT DOCUMENTS

| | | |
|---|---|---|
| WO | 2007/032945 | 3/2007 |
| WO | 2007/073534 | 6/2007 |

* cited by examiner

200

400

800

802

Come Join the Fun!!
Play your favorite game even if it's already being played.

804

| Active Sessions | | | | | |
|---|---|---|---|---|---|
| Session ID | Type | Initial Wager | Current Amount | Elapsed Time | Time Remaining |
| 101 | Star Wars | $20.00 | $50.45 | 1:06 | 0:54 |
| 102 | Player A | $100.00 | $98.00 | 0:25 | 0:35 |
| 103 | EGM 301 | $50.00 | $75.00 | 1:31 | 0:29 |

| Promotions | | | | |
|---|---|---|---|---|
| Session ID | Type | Min. Wager | Session Time | Promotion |
| P201 | Wheel of Fortune 2 | $10.00 | 1:00 | Double winnings |
| P202 | Star Wars | $20.00 | 2:00 | Free breakfast |
| P203 | Video Blackjack | $5.00 | 0:30 | $5 bonus credit |

806

Fig. 8

DYNAMIC SIDE WAGERING SYSTEM FOR USE WITH ELECTRONIC GAMING DEVICES

BACKGROUND

This disclosure relates to casino gaming technology, and more specifically to dynamic side wagering systems for use with electronic gaming machines and gaming tables.

Gaming machines and gaming machine establishments like casinos are popular entertainment, attracting many visitors annually. In an effort to provide a satisfying gaming opportunity for their players while keeping their overhead costs to a minimum, casino operators have attempted to meet the projected playing needs of their players while simultaneously seeking to preserve resources required by superfluous machines, which, in turn, requires additional square footage to house such machines and the concomitant services to support the additional machines and square footage.

Modern gaming machines are typically networked together, which allows accounting functions such as game tracking, player tracking, and bonusing to be available at any machine connected to the network. For example, a player who has identified himself to the casino by becoming a loyalty card holder can access his account at any gaming machine on the network equipped to handle the input of the player's identifying information, whether by loyalty card or personal identification number.

Traditional methods to control the flow of play on the casino floor to maximize gaming machine play has largely centered around attempting to modify a player's playing habits by using incentives to pull the player into the casinos at what historically would have been off-peak times where fewer numbers of players were expected to be playing the machines. However, behavior modification is not always possible or desirable for the casino. By attempting to equalize attendance over the course of a day, week, month, or year, casinos are competing with factors beyond their control, such as employment and player travel and time of day preferences, and players and casinos alike are missing out on the excitement of larger crowds and the enhancements such crowds bring to the gaming experience.

Embodiments described herein address these and other deficiencies in casino gaming systems.

SUMMARY OF THE INVENTION

Various aspects of the present invention are directed to different methods, systems, and computer program products for facilitating side wagering activities conducted at a casino which includes a casino gaming network. In at least one embodiment, the gaming network includes a plurality of gaming machines, including a first gaming machine. A side wager request may be received for placing a first side wager relating to a first gaming machine. An identity of a first player associated with generating the first side wager request may be determined. A first side wager session may be automatically initiated. In at least one embodiment, the initiation of the first side wager session may include automatically placing the first side wager at the casino gaming network, and associating the placed first side wager with the identified first player. In one embodiment, the first side wager includes first side wager criteria specifying that an outcome of the first side wager is related to at least one event associated with game play at the first gaming machine.

Other aspects of the present invention are directed to different methods, systems, and computer program products for facilitating side wagering activities conducted at a casino which includes a casino gaming network. In at least one embodiment, the gaming network includes a plurality of gaming machines, including a first gaming machine. The gaming network may also include a first wireless handheld device operable to facilitate side wagering activities. A first side wager request for placing a first side wager relating to a first gaming machine may be received a the handheld device. A unique identifier may be determined for use in identifying a first player associated with generating the first side wager request. At least one operation may be automatically performed at the first handheld device for facilitating ignition of a first side wager session. In at least one embodiment, the initiation of the first side wager session may include placing the first side wager at the casino gaming network, and associating the placed first side wager with the identified first player. Additionally, in at least one embodiment, the first side wager may include first side wager criteria specifying that an outcome of the first side wager is related to at least one event associated with game play at the first gaming machine.

Additional objects, features and advantages of the various aspects of the present invention will become apparent from the following description of its preferred embodiments, which description should be taken in conjunction with the accompanying drawings.

BRIEF DESCRIPTION OF THE DRAWINGS

FIG. 8 shows an example of a promotional display 800 in accordance with the specific embodiment.

EXAMPLE EMBODIMENTS

Figure 1:
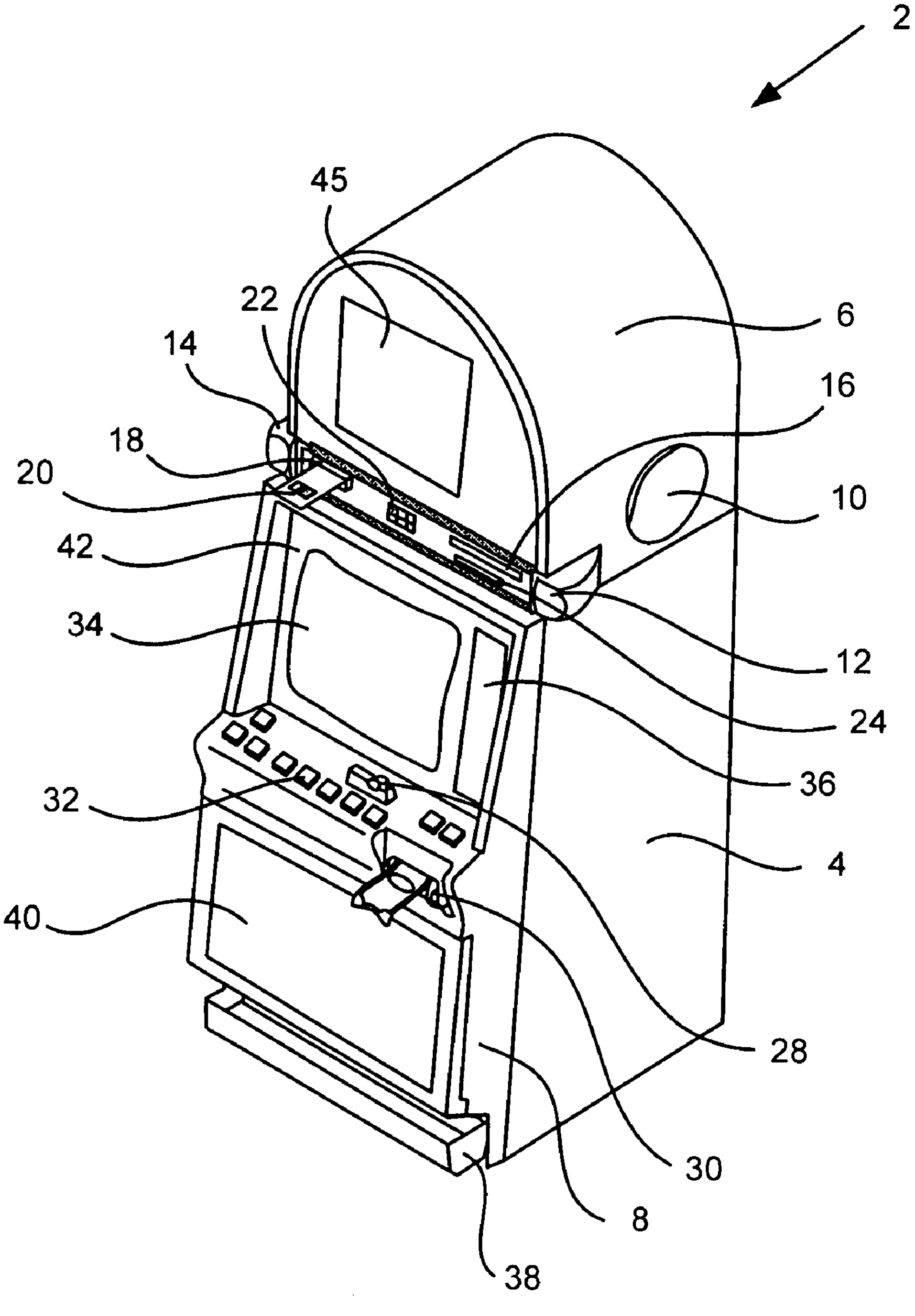
FIG. 1 shows a perspective view of an exemplary gaming machine 2 in accordance with a specific example of an embodiment.

Example embodiments will now be described in further detail, and accompanied by the drawings. In the following description, numerous specific details are set forth in order to provide a thorough understanding of example embodiments. It will be apparent, however, to one skilled in the art, that example embodiments may be practiced without some or all of these specific details. In other instances, well known process steps and/or structures have not been described in detail in order to not obscure example embodiments.

A wager-based game may be generally defined as a game in which one or more players can place a wager or bet on an outcome that is uncertain at the time the wager is made. Typically, casinos provide their patrons with a variety of different wager-based gaming opportunities including, for example, gaming machines (e.g., slot machines and/or other electronic gaming machines), table games (e.g., Blackjack, Roulette, Craps, Baccarat, Poker, etc.), etc.

In some wager-based games, a wager made by a player is accepted by a "house", which may be representative of a gaming establishment hosting the particular game, for example. If the outcome is realized, the house provides a payout based on the wager made in accordance with established rules governing the particular game. Many popular casino games (e.g., Blackjack, Roulette, Craps, Baccarat, etc.), fall into this category of wager-based games. In such games, payouts on player wagers are typically provided by the house when the player wins in accordance with the rules of the respective games, as may be the case if a player holds a hand (of playing cards) that beats the hand of a house dealer, or if the player successfully predicts the outcome of a random event associated with the roll of dice or the spinning of a wheel, for example.

In another form of wager-based games, wagers are made between multiple players of a game, played between players and not against a house. Some variations of the game of poker (e.g., Texas Hold'em, Seven Card Stud, Omaha, etc.) fall into this category of wager-based games. In such games, wagers may be made by players at various stages during the play of a hand, each player betting that he will "win" the hand in accordance with the rules of the particular game being played. At the completion of a hand, each winner is then generally entitled to at least a portion of all wagers made during the play of that hand. In these types of games, although a house does not typically participate by playing a hand, in games hosted by a gaming establishment, a portion of all wagers made during the play of the hand (i.e., a rake) may be collected by the house before payouts are distributed to each winner.

Generally speaking, wager-based games include both games of skill and games of chance. For example, according to one implementation, a game of chance may be defined as a game that includes at least one element wherein a randomness affects the outcome of the game, either positively or negatively. For example, a typical slot game is a game of chance because the reels stop at randomly determined positions. On the other hand, a game of skill has at least one element wherein the player can intentionally affect the outcome of the game, in a known manner, either positively or negatively. According to specific embodiments, skill may include strategy, physical skill, coordination, etc. For example, poker is considered to be a game of skill because the player decides what cards to hold, how to bet, whether to bluff, etc. The outcome for a game of skill may typically be dependent upon or effected by the skill level of the player (or players) participating in the game of skill. Conversely, the outcome for a game of chance typically has little or no dependence upon the skill level of the player (or players) participating in the game of chance.

Various embodiments are directed to various side wagering (also referred to as side wagering, side betting, proxy betting, etc.) systems implemented in a casino gaming environment which includes a casino gaming network of electronic gaming machines that allow non-primary players of the gaming machines to participate in gaming and/or wagering activities associated with one or more electronic gaming machines, and/or other electronic gaming devices. In at least one embodiment, a "primary" player of a gaming machine may be defined to include a person who is physically present at the gaming, and actively engaged in game play and/or wagering decisions at that gaming machine. Further, in at least one embodiment, and a "secondary player" or "non-primary" player may be defined to include persons who are not physically present at the gaming, and/or persons who do not have control of game play decisions and/or wagering decisions at that gaming machine.

In at least one implementation, the side wagering systems of the present invention enable casinos operators to provide wagering opportunities to non-primary players of electronic game tables. In other embodiments, the side wagering systems of the present invention enable casinos operators to provide wagering opportunities to non-primary players of electronic gaming machines. This may be useful, for example, in situations where there are insufficient numbers of available machines for the non-playing patrons to play, or in situations where the non-playing patrons prefer to bet on the outcome of gaming performed by others rather than playing the games themselves. In so doing, various embodiments allow a casino operator to provide gaming opportunities to a greater number of players or patrons than there are available machines. A resulting benefit of this is that operators need not attempt to engage in behavior modification of their players to time shift gaming to off-peak hours in order to maximize casino revenues.

According to various embodiments of the present invention, the definition of an electronic gaming machine may vary according to different jurisdictional requirements/regulations. Shown below are various examples of how different types of entities may define various casino gaming related terms:

Nevada Gaming Regulation 1

Issuance of Regulations: Construction; Definitions 1.060 "Card game" defined. "Card game" means a game in which the licensee is not party to wagers and from which the licensee receives compensation in the form of a rake-off, a time buy-in, or other fee or payment from a player for the privilege of playing, and includes but is not limited to the following: Poker, bridge, whist, solo and panguingui.

1.080 "Counter game" defined. "Counter game" means a game in which the licensee is party to wagers and wherein the licensee documents all wagering activity. The term includes, but is not limited to bingo, keno, race books, and sports pools. The term does not include table games, card games and slot machines.

Nevada Gaming Regulation 29

Slot Machine Tax and License Fees 29.020 Definition. "Slot machine" means any mechanical, electrical or other device, contrivance or machine which, upon insertion of a coin, currency, token or similar object therein, or upon payment of any consideration whatsoever, is available to play or operate, the play or operation of which, whether by reason of the skill of the operator or application of the element of chance, or both, may deliver or entitle the person playing or operating the machine to receive cash, premiums, or merchandise, tokens or anything of value whatsoever, whether the payoff is made automatically from the machine or in any other manner whatsoever.

Gaming Labs Internation (www.gaminglabs.com) Standards:

1.5.1 General Statement. A gaming device at a minimum will contain embodiment of randomness in determination of prizes, contain some form of activation to initiate the selection process, and contain a methodology for delivery of the determined outcome. The gaming device may be separated in parts, where some may be within or outside the player terminal (e.g., gaming devices that function with a system).

It will be appreciated that are a variety of distinctions which differentiate conventional electronic game tables from electronic gaming machines. For example, in at least some embodiments, an electronic table game may be defined to include multiple player stations for permitting multiple patrons to participate in game play activities which are conducted at the electronic table game. Examples of various types of electronic table game include: table games where physical playing cards are used to conduct game play (e.g., blackjack, poker, baccarat, Let It Ride™, 3-Card Poker, etc.); table games where multiple players are able to place wagers on events which take place at the gaming table (such as, for example, roulette table games, craps table games, etc.).

In contrast, in at least some embodiments, an electronic gaming machine may be defined to include gaming machines which are configured or designed to include a single or isolated player station for permitting one "active" patron at a time to physically interact with the electronic gaming machine and to actively participate in game play activities at the electronic gaming machine. Examples of various types of electronic table game include: slot machines, video poker machines, video blackjack machines, multi-reel video slots, hybrid mechanical/video gaming machines, etc.

According to at least one embodiment, the active participation of game play activities at an EGM includes game play conducted by a current or primary player who may physically occupy the player station at the EGM and who may have control of game play decisions and/or wagering decisions at that gaming machine. However, in at least one embodiment, the active participation of game play activities at an EGM does not include game play conducted by non-primary players, such as, for example, side wagerers, who do not physically occupy the player station at the EGM and/or who do not have control of game play decisions and/or wagering decisions at that gaming machine.

In at least one embodiment of the present invention, a pay table of a gaming device may refer to the standard winnings paid or credited to the player by the device itself. A bonus award may refer to credits either credited to a machine or credited to a player account by a bonus system, or bonus points credited to a player account by the bonus system. A system award may refer to a benefit that is paid or credited to a player of a gaming device or table that is not based on either the pay table or a bonus award. Examples of system awards include a complementary meal or show ticket, a drawing ticket, or bonus points or machine credits not based on a gaming device pay table. Together bonus awards and system awards may be referred to herein as incentive awards.

Example Gaming Machine Embodiments

FIG. 1 shows a perspective view of an exemplary gaming machine 2 in accordance with a specific example of an embodiment. As illustrated in the example of FIG. 1, machine 2 includes a main cabinet 4, which generally surrounds the machine interior (illustrated, for example, in FIG. 3) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. The information panel 36 may be a back-lit, silk screened glass panel with lettering to indicate general game information including, for example, a game denomination (e.g. $0.25 or $1). The bill validator 30, player-input switches 32, video display monitor 34, and information panel are devices used to play a game on the game machine 2. According to a specific embodiment, the devices may be controlled by code executed by a master gaming controller housed inside the main cabinet 4 of the machine 2. In specific embodiments where it may be required that the code be periodically configured and/or authenticated in a secure manner, example embodiments may be used for accomplishing such tasks.

Many different types of games, including mechanical slot games, video slot games, video poker, video black jack, video pachinko and lottery, may be provided with gaming machines of this invention. In particular, the gaming machine 2 may be operable to provide a play of many different instances of games of chance. The instances may be differentiated according to themes, sounds, graphics, type of game (e.g., slot game vs. card game), denomination, number of paylines, maximum jackpot, progressive or non-progressive, bonus games, etc. The gaming machine 2 may be operable to allow a player to select a game of chance to play from a plurality of instances available on the gaming machine. For example, the gaming machine may provide a menu with a list of the instances of games that are available for play on the gaming machine and a player may be able to select from the list a first instance of a game of chance that they wish to play.

The various instances of games available for play on the gaming machine 2 may be stored as game software on a mass storage device in the gaming machine or may be generated on a remote gaming device but then displayed on the gaming machine. The gaming machine 2 may executed game software, such as but not limited to video streaming software that allows the game to be displayed on the gaming machine. When an instance is stored on the gaming machine 2, it may be loaded from the mass storage device into a RAM for execution. In some cases, after a selection of an instance, the game software that allows the selected instance to be generated may be downloaded from a remote gaming device, such as another gaming machine.

As illustrated in the example of FIG. 1, the gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which prints bar-coded tickets 20, a key pad 22 for entering player tracking information, a florescent display 16 for displaying player tracking information, a card reader 24 for entering a magnetic striped card containing player tracking information, and a video display screen 45. The ticket printer 18 may be used to print tickets for a cashless ticketing system. Further, the top box 6 may house different or additional devices not illustrated in FIG. 1. For example, the top box may include a bonus wheel or a back-lit silk screened panel which may be used to add bonus features to the game being played on the gaming machine. As another example, the top box may include a display for a progressive jackpot offered on the gaming machine. During a game, these devices are controlled and powered, in part, by circuitry (e.g. a master gaming controller) housed within the main cabinet 4 of the machine 2.

It will be appreciated that gaming machine 2 is but one example from a wide range of gaming machine designs relating to example embodiments. For example, not all suitable gaming machines have top boxes or player tracking features. Further, some gaming machines have only a single game display—mechanical or video, while others are designed for bar tables and have displays that face upwards. As another example, a game may be generated in on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Images rendered from 3-D gaming environments may be displayed on portable gaming devices that are used to play a game of chance. Further a gaming machine or server may include gaming logic for commanding a remote gaming device to render an image from a virtual camera in a 3-D gaming environments stored on the remote gaming device and to display the rendered image on a display located on the remote gaming device. Thus, those of skill in the art will understand that example embodiments, as described below, may be deployed on most any gaming machine now available or hereafter developed.

Some preferred gaming machines of the present assignee are implemented with special features and/or additional circuitry that differentiates them from general-purpose computers (e.g., desktop PC's and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine may be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

For example, a watchdog timer is normally used in International Game Technology (IGT) gaming machines to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to allow the operating software to set the timeout interval within a certain range of time. A differentiating feature of the some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These may be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. Gaming machines of the present assignee typically have power supplies with tighter voltage margins than that required by the operating circuitry. In addition, the voltage monitoring circuitry implemented in IGT gaming computers typically has two thresholds of control. The first threshold generates a software event that may be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT slot machine game software is to use a state machine. Different functions of the game (bet, play, result, points in the graphical presentation, etc.) may be defined as a state. When a game moves from one state to another, critical data regarding the game software is stored in a custom non-volatile memory subsystem. This is critical to ensure the player's wager and credits are preserved and to minimize potential disputes in the event of a malfunction on the gaming machine.

In general, the gaming machine does not advance from a first state to a second state until critical information that allows the first state to be reconstructed is stored. This feature allows the game to recover operation to the current state of play in the event of a malfunction, loss of power, etc that occurred just prior to the malfunction. After the state of the gaming machine is restored during the play of a game of chance, game play may resume and the game may be completed in a manner that is no different than if the malfunction had not occurred. Typically, battery backed RAM devices are used to preserve this critical data although other types of non-volatile memory devices may be employed. These memory devices are not used in typical general-purpose computers.

As described in the preceding paragraph, when a malfunction occurs during a game of chance, the gaming machine may be restored to a state in the game of chance just prior to when the malfunction occurred. The restored state may include metering information and graphical information that was displayed on the gaming machine in the state prior to the malfunction. For example, when the malfunction occurs during the play of a card game after the cards have been dealt, the gaming machine may be restored with the cards that were previously displayed as part of the card game. As another example, a bonus game may be triggered during the play of a game of chance where a player is required to make a number of selections on a video display screen. When a malfunction has occurred after the player has made one or more selections, the gaming machine may be restored to a state that shows the graphical presentation at the just prior to the malfunction including an indication of selections that have already been made by the player. In general, the gaming machine may be restored to any state in a plurality of states that occur in the game of chance that occurs while the game of chance is played or to states that occur between the play of a game of chance.

Game history information regarding previous games played such as an amount wagered, the outcome of the game and so forth may also be stored in a non-volatile memory device. The information stored in the non-volatile memory may be detailed enough to reconstruct a portion of the graphical presentation that was previously presented on the gaming machine and the state of the gaming machine (e.g., credits) at the time the game of chance was played. The game history information may be utilized in the event of a dispute. For example, a player may decide that in a previous game of chance that they did not receive credit for an award that they believed they won. The game history information may be used to reconstruct the state of the gaming machine prior, during and/or after the disputed game to demonstrate whether the player was correct or not in their assertion. Further details of a state based gaming system, recovery from malfunctions and game history are described in U.S. Pat. No. 6,804,763, titled "High Performance Battery Backed RAM Interface", U.S. Pat. No. 6,863,608, titled "Frame Capture of Actual Game Play," U.S. application Ser. No. 10/243,104, titled, "Dynamic NV-RAM," and U.S. application Ser. No. 10/758,828, titled, "Frame Capture of Actual Game Play," each of which is incorporated by reference and for all purposes.

Another feature of gaming machines, such as IGT gaming computers, is that they often include unique interfaces, including serial interfaces, to connect to specific subsystems internal and external to the slot machine. The serial devices may have electrical interface requirements that differ from the "standard" EIA 232 serial interfaces provided by general-purpose computers. These interfaces may include EIA 485, EIA 422, Fiber Optic Serial, optically coupled serial interfaces, current loop style serial interfaces, etc. In addition, to conserve serial interfaces internally in the slot machine, serial devices may be connected in a shared, daisy-chain fashion where multiple peripheral devices are connected to a single serial channel.

The serial interfaces may be used to transmit information using communication protocols that are unique to the gaming industry. For example, IGT's Netplex is a proprietary communication protocol used for serial communication between gaming devices. As another example, SAS is a communication protocol used to transmit information, such as metering information, from a gaming machine to a remote device. Often SAS is used in conjunction with a player tracking system.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into an IGT gaming machine by monitoring security switches attached to access doors in the slot machine cabinet. Preferably, access violations result in suspension of game play and can trigger additional security operations to preserve the current state of game play. These circuits also function when power is off by use of a battery backup. In power-off operation, these circuits continue to monitor the access doors of the slot machine. When power is restored, the gaming machine can determine whether any security violations occurred while power was off, e.g., via software for reading status registers. This can trigger event log entries and further data authentication operations by the slot machine software.

Trusted memory devices and/or trusted memory sources are preferably included in an IGT gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the slot machine. The code and data stored in these devices may include authentication algorithms, random number generators, authentication keys, operating system kernels, etc. The purpose of these trusted memory devices is to provide gaming regulatory authorities a root trusted authority within the computing environment of the slot machine that may be tracked and verified as original. This may be accomplished via removal of the trusted memory device from the slot machine computer and verification of the secure memory device contents is a separate third party verification device. Once the trusted memory device is verified as authentic, and based on the approval of the verification algorithms included in the trusted device, the gaming machine is allowed to verify the authenticity of additional code and data that may be located in the gaming computer assembly, such as code and data stored on hard disk drives. A few details related to trusted memory devices that may be used in example embodiments are described in U.S. Pat. No. 6,685,567, filed Aug. 8, 2001 and titled "Process Verification," and U.S. patent application Ser. No. 11/221,314, titled "Data Pattern Verification in a Gaming Machine Environment," filed Sep. 6, 2005, each of which is incorporated herein by reference in its entirety and for all purposes.

In at least one embodiment, at least a portion of the trusted memory devices/sources may correspond to memory which cannot easily be altered (e.g., "unalterable memory") such as, for example, EPROMS, PROMS, Bios, Extended Bios, and/or other memory sources which are able to be configured, verified, and/or authenticated (e.g., for authenticity) in a secure and controlled manner.

According to a specific implementation, when a trusted information source is in communication with a remote device via a network, the remote device may employ a verification scheme to verify the identity of the trusted information source. For example, the trusted information source and the remote device may exchange information using public and private encryption keys to verify each other's identities. In another example of an embodiment, the remote device and the trusted information source may engage in methods using zero knowledge proofs to authenticate each of their respective identities. Details of zero knowledge proofs that may be used with example embodiments are described in US publication no. 2003/0203756, by Jackson, filed on Apr. 25, 2002 and entitled, "Authentication in a Secure Computerized Gaming System", which is incorporated herein in its entirety and for all purposes.

Gaming devices storing trusted information may utilize apparatus or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

Additional details relating to trusted memory devices/sources are described in U.S. patent application Ser. No. 11/078,966, entitled "SECURED VIRTUAL NETWORK IN A GAMING ENVIRONMENT", naming Nguyen et al. as inventors, filed on Mar. 10, 2005, herein incorporated in its entirety and for all purposes.

Mass storage devices used in a general purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present. Details using a mass storage device that may be used with example embodiments are described, for example, in U.S. Pat. No. 6,149,522, herein incorporated by reference in its entirety for all purposes.

Returning to the example of FIG. 1, when a user wishes to play the gaming machine 2, he or she inserts cash through the coin acceptor 28 or bill validator 30. Additionally, the bill validator may accept a printed ticket voucher which may be accepted by the bill validator 30 as an indicia of credit when a cashless ticketing system is used. At the start of the game, the player may enter playing tracking information using the card reader 24, the keypad 22, and the florescent display 16. Further, other game preferences of the player playing the game may be read from a card inserted into the card reader. During the game, the player views game information using the video display 34. Other game and prize information may also be displayed in the video display screen 45 located in the top box.

During the course of a game, a player may be required to make a number of decisions, which affect the outcome of the game. For example, a player may vary his or her wager on a particular game, select a prize for a particular game selected from a prize server, or make game decisions which affect the outcome of a particular game. The player may make these choices using the player-input switches 32, the video display screen 34 or using some other device which enables a player to input information into the gaming machine. In some embodiments, the player may be able to access various game services such as concierge services and entertainment content services using the video display screen 34 and one more input devices.

During certain game events, the gaming machine 2 may display visual and auditory effects that may be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights behind the belly glass 40. After the player has completed a game, the player may receive game tokens from the coin tray 38 or the ticket 20 from the printer 18, which may be used for further games or to redeem a prize. Further, the player may receive a ticket 20 for food, merchandise, or games from the printer 18.

Figure 2:
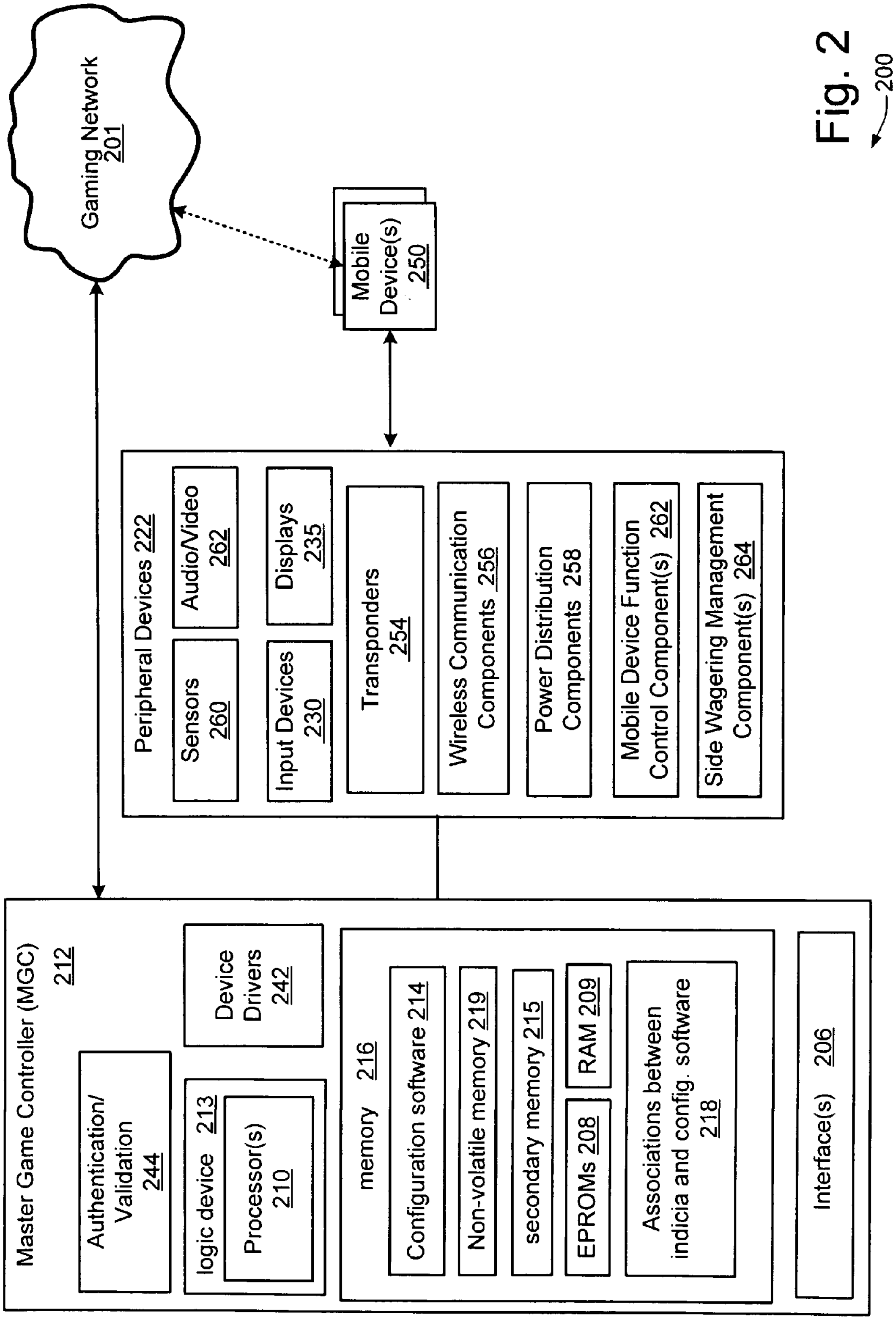
FIG. 2 is a simplified block diagram of an exemplary gaming machine 200 in accordance with a specific embodiment.

FIG. 2 is a simplified block diagram of an exemplary gaming machine 200 in accordance with a specific embodiment. As illustrated in the embodiment of FIG. 2, gaming machine 200 includes at least one processor 210, at least one interface 206, and memory 216.

In one implementation, processor 210 and master game controller 212 are included in a logic device 213 enclosed in a logic device housing. The processor 210 may include any conventional processor or logic device configured to execute software allowing various configuration and reconfiguration tasks such as, for example: a) communicating with a remote source via communication interface 206, such as a server that stores authentication information or games; b) converting signals read by an interface to a format corresponding to that used by software or memory in the gaming machine; c) accessing memory to configure or reconfigure game parameters in the memory according to indicia read from the device; d) communicating with interfaces, various peripheral devices 222 and/or I/O devices; e) operating peripheral devices 222 such as, for example, card readers, paper ticket readers, etc.; f) operating various I/O devices such as, for example, displays 235, input devices 230; etc. For instance, the processor 210 may send messages including game play information to the displays 235 to inform players of cards dealt, wagering information, and/or other desired information.

The gaming machine 200 also includes memory 216 which may include, for example, volatile memory (e.g., RAM 209), non-volatile memory 219 (e.g., disk memory, FLASH memory, EPROMs, etc.), unalterable memory (e.g., EPROMs 208), etc. The memory may be configured or designed to store, for example: 1) configuration software 214 such as all the parameters and settings for a game playable on the gaming machine; 2) associations 218 between configuration indicia read from a device with one or more parameters and settings; 3) communication protocols allowing the processor 210 to communicate with peripheral devices 222 and I/O devices 211; 4) a secondary memory storage device 215 such as a non-volatile memory device, configured to store gaming software related information (the gaming software related information and memory may be used to store various audio files and games not currently being used and invoked in a configuration or reconfiguration); 5) communication transport protocols (such as, for example, TCP/IP, USB, Firewire, IEEE1394, Bluetooth, IEEE 802.11x (IEEE 802.11 standards), hiperlan/2, HomeRF, etc.) for allowing the gaming machine to communicate with local and non-local devices using such protocols; etc. In one implementation, the master game controller 212 communicates using a serial communication protocol. A few examples of serial communication protocols that may be used to communicate with the master game controller include but are not limited to USB, RS-232 and Netplex (a proprietary protocol developed by IGT, Reno, Nev.).

A plurality of device drivers 242 may be stored in memory 216. Example of different types of device drivers may include device drivers for gaming machine components, device drivers for peripheral components 222, etc. Typically, the device drivers 242 utilize a communication protocol of some type that enables communication with a particular physical device. The device driver abstracts the hardware implementation of a device. For example, a device drive may be written for each type of card reader that may be potentially connected to the gaming machine. Examples of communication protocols used to implement the device drivers include Netplex, USB, Serial, Ethernet 275, Firewire, I/O debouncer, direct memory map, serial, PCI, parallel, RF, Bluetooth™, near-field communications (e.g., using near-field magnetics), 802.11 (WiFi), etc. Netplex is a proprietary IGT standard while the others are open standards. According to a specific embodiment, when one type of a particular device is exchanged for another type of the particular device, a new device driver may be loaded from the memory 216 by the processor 210 to allow communication with the device. For instance, one type of card reader in gaming machine 200 may be replaced with a second type of card reader where device drivers for both card readers are stored in the memory 216.

In some embodiments, the software units stored in the memory 216 may be upgraded as needed. For instance, when the memory 216 is a hard drive, new games, game options, various new parameters, new settings for existing parameters, new settings for new parameters, device drivers, and new communication protocols may be uploaded to the memory from the master game controller 212 or from some other external device. As another example, when the memory 216 includes a CD/DVD drive including a CD/DVD designed or configured to store game options, parameters, and settings, the software stored in the memory may be upgraded by replacing a first CD/DVD with a second CD/DVD. In yet another example, when the memory 216 uses one or more flash memory 219 or EPROM 208 units designed or configured to store games, game options, parameters, settings, the software stored in the flash and/or EPROM memory units may be upgraded by replacing one or more memory units with new memory units which include the upgraded software. In another embodiment, one or more of the memory devices, such as the hard-drive, may be employed in a game software download process from a remote software server.

In some embodiments, the gaming machine 200 may also include various authentication and/or validation components 244 which may be used for authenticating/validating specified gaming machine components such as, for example, hardware components, software components, firmware components, information stored in the gaming machine memory 216, etc. Examples of various authentication and/or validation components are described in U.S. Pat. No. 6,620,047, entitled, "ELECTRONIC GAMING APPARATUS HAVING AUTHENTICATION DATA SETS," incorporated herein by reference in its entirety for all purposes.

Peripheral devices 222 may include several device interfaces such as, for example: transponders 254, wire/wireless power distribution components 258, input device(s) 230, sensors 260, audio and/or video devices 262 (e.g., cameras, speakers, etc.), transponders 254, wireless communication components 256, wireless power components 258, mobile device function control components 262, side wagering management components 264, etc.

Sensors 260 may include, for example, optical sensors, pressure sensors, RF sensors, Infrared sensors, image sensors, thermal sensors, biometric sensors, etc. Such sensors may be used for a variety of functions such as, for example detecting the presence and/or identity of various persons (e.g., players, casino employees, etc.), devices (e.g., mobile devices), and/or systems within a predetermined proximity to the gaming machine. In one implementation, at least a portion of the sensors 260 and/or input devices 230 may be implemented in the form of touch keys selected from a wide variety of commercially available touch keys used to provide electrical control signals. Alternatively, some of the touch keys may be implemented in another form which are touch sensors such as those provided by a touchscreen display. For example, in at least one implementation, the gaming machine player displays and/or mobile device displays may include input functionality for allowing players to provide desired information (e.g., game play instructions and/or other input) to the gaming machine, game table and/or other gaming system components using the touch keys and/or other player control sensors/buttons. Additionally, such input functionality may also be used for allowing players to provide input to other devices in the casino gaming network (such as, for example, player tracking systems, side wagering systems, etc.)

Wireless communication components 256 may include one or more communication interfaces having different architectures and utilizing a variety of protocols such as, for example, 802.11 (WiFi), 802.15 (including Bluetooth™), 802.16 (WiMax), 802.22, Cellular standards such as CDMA, CDMA2000, WCDMA, Radio Frequency (e.g., RFID), Infrared, Near Field Magnetic communication protocols, etc. The communication links may transmit electrical, electromagnetic or optical signals which carry digital data streams or analog signals representing various types of information.

Power distribution components 258 may include, for example, components or devices which are operable for providing wired or wireless power to other devices. For example, in one implementation, the power distribution components 258 may include a magnetic induction system which is adapted to provide wireless power to one or more mobile devices near the gaming machine. In one implementation, a mobile device docking region may be provided which includes a power distribution component that is able to recharge a mobile device without requiring metal-to-metal contact.

Figure 3:
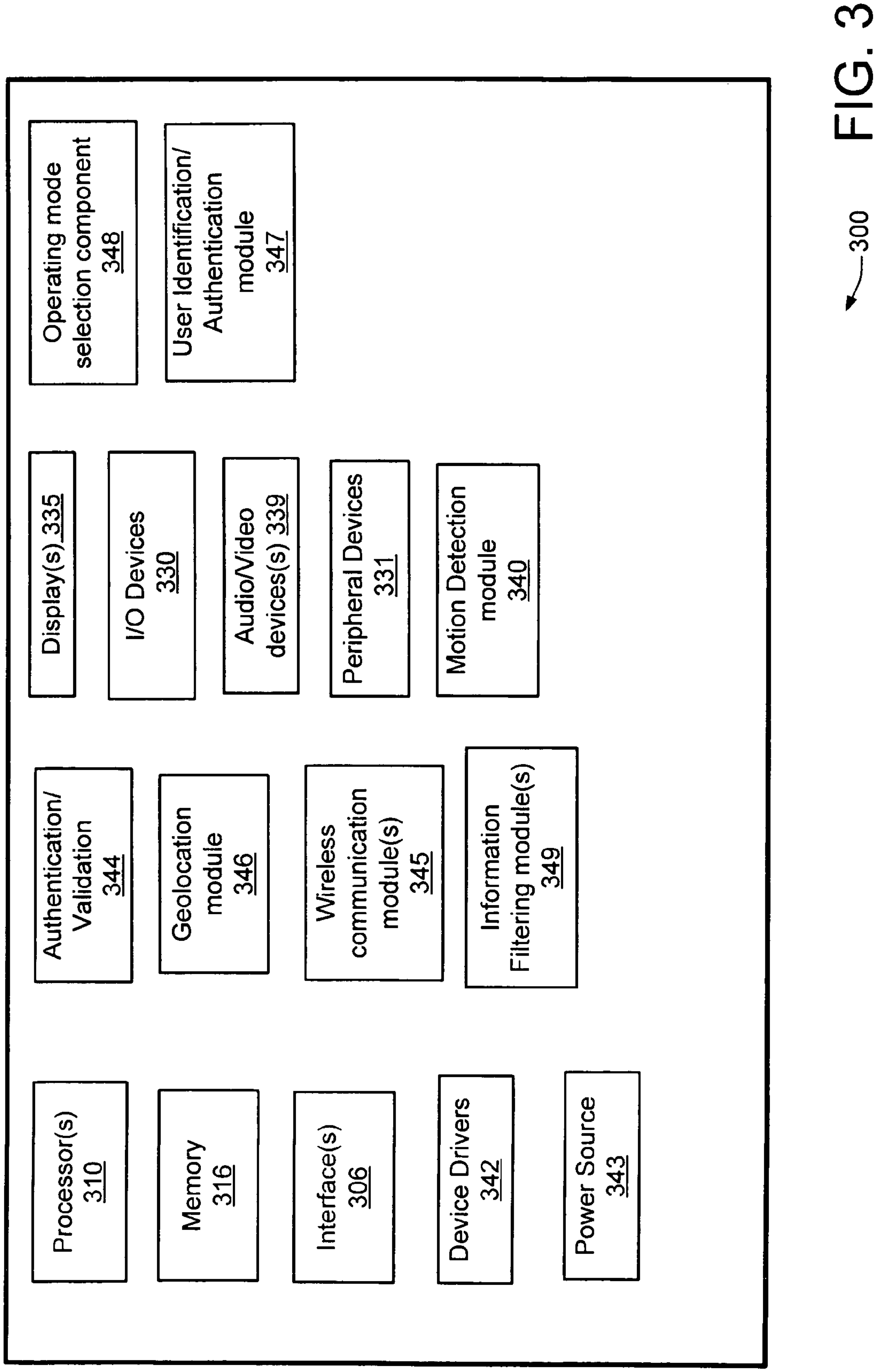
FIG. 3 is a simplified block diagram of an exemplary mobile device 300 in accordance with a specific example of an embodiment.

In at least one embodiment, mobile device function control components 262 may be operable to control operating mode selection functionality, features, and/or components associated with one or more mobile devices (e.g., 250) such as, for example, mobile device 300 of FIG. 3. In at least one embodiment, mobile device function control components 262 may be operable to remotely control and/or configure components of one or more mobile devices 250 based on various parameters and/or upon detection of specific events or conditions such as, for example: time of day, player activity levels; location of the mobile device; identity of mobile device user; user input; system override (e.g., emergency condition detected); proximity to other devices belonging to same group or association; proximity to specific objects, regions, zones, etc.

In at least one embodiment, side wagering management components 264 may be operable to manage side wagering activities associated with one or more side wager participants. Side wagering management components 264 may also be operable to manage or control side wagering functionality associated with one or more mobile devices 250. In accordance with at least one embodiment, side wagers may be associated with specific events in a wager-based game that is uncertain at the time the side wager is made. The events may also be associated with particular players, gaming devices (e.g., EGMs), game themes, bonuses, denominations, and/or paytables. In embodiments where the wager-based game is being played by multiple players, in one embodiment the side wagers may be made by participants who are not players of the game, and who are thus at least one level removed from the actual play of the game.

The term "participant" as used herein, may denote not only players who are involved in the actual play of the wager-based game, but also observers that are not involved in the actual play of the wager-based game but who receive information on the wager-based game being played by the players.

In instances where side wagers are made on events that depend at least in part on the skill of a particular player, it may be beneficial to provide observers (e.g., side wager participants) with information which is useful for determining whether a particular side wager should be placed, and/or for helping to determine the amount of such side wager. In at least one embodiment, side wagering management components 264 may be operable to manage and/or facilitate data access to player ratings, historical game play data, historical payout data, etc. For example, in one embodiment, a player rating for a player of the wager-based game may be computed based on historical data associated with past play of the wager-based game by that player in accordance with a pre-determined algorithms. The player rating for a particular player may be displayed to other players and/or observers, possibly at the option (or permission) of the player. By using player ratings in the consideration of making side wagers, decisions by observers to make side wagers on certain events need not be made completely at random. Player ratings may also be employed by the players themselves to aid them in determining potential opponents, for example.

In other embodiments (not shown) other peripheral devices include: player tracking devices, card readers, bill validator/paper ticket readers, etc. Such devices may each comprise resources for handling and processing configuration indicia such as a microcontroller that converts voltage levels for one or more scanning devices to signals provided to processor 210. In one embodiment, application software for interfacing with peripheral devices 222 may store instructions (such as, for example, how to read indicia from a portable device) in a memory device such as, for example, non-volatile memory, hard drive or a flash memory.

In at least one implementation, the gaming machine may include card readers such as used with credit cards, or other identification code reading devices to allow or require player identification in connection with play of the card game and associated recording of game action. Such a user identification interface may be implemented in the form of a variety of magnetic card readers commercially available for reading a user-specific identification information. The user-specific information may be provided on specially constructed magnetic cards issued by a casino, or magnetically coded credit cards or debit cards frequently used with national credit organizations such as VISA™, MASTERCARD™, banks and/or other institutions.

The gaming machine may include other types of participant identification mechanisms which may use a fingerprint image, eye blood vessel image reader, or other suitable biological information to confirm identity of the user. Still further it is possible to provide such participant identification information by having the dealer manually code in the information in response to the player indicating his or her code name or real name. Such additional identification could also be used to confirm credit use of a smart card, transponder, and/or player's mobile device.

It will be apparent to those skilled in the art that other memory types, including various computer readable media, may be used for storing and executing program instructions pertaining to the operation EGMs described herein. Because such information and program instructions may be employed to implement the systems/methods described herein, example embodiments may relate to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Example embodiments may also be embodied in a carrier wave traveling over an appropriate medium such as airwaves, optical lines, electric lines, etc. Examples of program instructions include both machine code, such as produced by a compiler, and files including higher level code that may be executed by the computer using an interpreter.

Additional details about other gaming machine architectures, features and/or components are described, for example, in U.S. patent application Ser. No. 10/040,239, entitled, "GAME DEVELOPMENT ARCHITECTURE THAT DECOUPLES THE GAME LOGIC FROM THE GRAPHICS LOGIC," and published on Apr. 24, 2003 as U.S. Patent Publication No. 20030078103, incorporated herein by reference in its entirety for all purposes.

FIG. 3 is a simplified block diagram of an exemplary mobile device 300 in accordance with a specific example of an embodiment. As illustrated in the example of FIG. 3 mobile device 300 may include a variety of components, modules and/or systems for providing various functionality. For example, as illustrated in FIG. 3, mobile device 300 may include one or more of the following:

- At least one processor 310. In at least one embodiment, the processor(s) 310 may include functionality similar to at least a portion of functionality implemented by one or more electronic gaming machines such as those described herein.
- Memory 316, which, for example, may include volatile memory (e.g., RAM), non-volatile memory (e.g., disk memory, FLASH memory, EPROMs, etc.), unalterable memory, and/or other types of memory. In at least one implementation, the memory 316 may include functionality similar to at least a portion of functionality implemented by one or more electronic gaming machine memory devices such as those described herein.
- Interface(s) 306 which, for example, may include wired interfaces and/or wireless interfaces. In at least one implementation, the interface(s) 306 may include functionality similar to at least a portion of functionality implemented by one or more electronic gaming machine interfaces such as those described herein. For example, in at least one implementation, the wireless communication interface(s) may be configured or designed to communicate with selected electronic game tables, electronic gaming machines, remote servers, other wireless devices (e.g., PDAs, cell phones, player tracking transponders, etc.), etc. Such wireless communication may be implemented using one or more wireless interfaces/protocols such as, for example, 802.11 (WiFi), 802.15 (including Bluetooth™), 802.16 (WiMax), 802.22, Cellular standards such as CDMA, CDMA2000, WCDMA, Radio Frequency (e.g., RFID), Infrared, Near Field Magnetics, etc.
- Device driver(s) 342. In at least one implementation, the device driver(s) 342 may include functionality similar to at least a portion of functionality implemented by one or more electronic gaming machine driver devices such as those described herein.
- At least one power source 343. In at least one implementation, the power source may include at least one mobile power source (e.g., battery) for allowing the mobile device to operate in a wireless and/or mobile environment. For example, in one implementation, the power source 343 may be implemented using a rechargeable, thin-film type battery. Further, in embodiments where it is desirable for the device to be flexible, the power source 343 may be designed to be flexible.
- Authentication/validation components 344 which, for example, may be used for authenticating and/or validating local hardware and/or software components, hardware/software components residing at a remote device, game play information, wager information, user information and/or identity, etc. Examples of various authentication and/or validation components are described in U.S. Pat. No. 6,620,047, entitled, "ELECTRONIC GAMING APPARATUS HAVING AUTHENTICATION DATA SETS," incorporated herein by reference in its entirety for all purposes.
- Geolocation module 346 which, for example, may be configured or designed to acquire geolocation information from remote sources and use the acquired geolocation information to determine information relating to a relative and/or absolute position of the mobile device. For example, in one implementation, the geolocation module 346 may be adapted to receive GPS signal information for use in determining the position or location of the mobile device. In another implementation, the geolocation module 346 may be adapted to receive multiple wireless signals from multiple remote devices (e.g., gaming machines, servers, wireless access points, etc.) and use the signal information to compute position/location information relating to the position or location of the mobile device.
- Motion detection component 340 for detecting motion or movement of the VCARD and/or for detecting motion, movement, gestures and/or other input data from user. In one embodiment, the motion detection component 340 may be operable to detect gross motion of a participant (e.g., player, dealer, etc.) in a casino table game. Additionally, in at least one embodiment, the motion detection component 340 may further be operable to perform one or more additional functions such as, for example: analyze the detected gross motion or gestures of a participant; interpret the participant's motion or gestures (e.g., in the context of the casino game being played) in order to identify instructions or input from the participant; utilize the interpreted instructions/input to advance the game state; etc. In other embodiments, at least a portion of these additional functions may be implemented at a remote system or device. In at least one embodiment, the motion detection component 340 may include one or more motion detection sensors such as, for example, MEMS (Micro Electro Mechanical System) accelerometers, that can detect the acceleration and/or other movements of the mobile or handheld device as it is moved by a user.
- Wireless communication module(s) 345. In one implementation, the wireless communication module 345 may be configured or designed to communicate with external devices using one or more wireless interfaces/protocols such as, for example, 802.11 (WiFi), 802.15 (including Bluetooth™), 802.16 (WiMax), 802.22, Cellular standards such as CDMA, CDMA2000, WCDMA, Radio Frequency (e.g., RFID), Infrared, Near Field Magnetics, etc.
- User Identification module 347. In one implementation, the User Identification module may be adapted to determine the identity of the current user or owner of the mobile device. For example, in one embodiment, the current user may be required to perform a log in process at the mobile device in order to access one or more features. Alternatively, the mobile device may be adapted to automatically determine the identity of the current user based upon one or more external signals such as, for example, an RFID tag or badge worn by the current user which provides a wireless signal to the mobile device for determining the identity of the current user. In at least one implementation, various security features may be incorporated into the mobile device to prevent unauthorized users from accessing confidential or sensitive information.

Information filtering module(s) 349 which, for example, may be adapted to automatically and dynamically generate, using one or more filter parameters, filtered information to be displayed on one or more displays of the mobile device. In one implementation, such filter parameters may be customizable by the player or user of the device. In some embodiments, information filtering module(s) 349 may also be adapted to display, in real-time, filtered information to the user based upon a variety of criteria such as, for example, geolocation information, casino data information, player tracking information, etc.

One or more display(s) 335. According to various embodiments, such display(s) may be implemented using, for example, LCD display technology, OLED display technology, and/or other types of conventional display technology. In at least one implementation, display(s) 335 may be adapted to be flexible or bendable. Additionally, in at least one embodiment the information displayed on display(s) 335 may utilize e-ink technology (such as that available from E Ink Corporation, Cambridge, Mass., www.eink.com), or other suitable technology for reducing the power consumption of information displayed on the display(s) 335.

One or more user I/O Device(s) 330 such as, for example, keys, buttons, scroll wheels, cursors, touchscreen sensors, audio command interfaces, magnetic strip reader, optical scanner, etc.

Audio/Video device(s) 339 which, for example, may include cameras, speakers, microphones, media presentation components, wireless transmitter/receiver devices for enabling wireless audio and/or visual communication between the mobile device 300 and remote devices (e.g., radios, telephones, computer systems, etc.). For example, in one implementation, the audio system may include componentry for enabling the mobile device to function as a cell phone or two-way radio device. such as, for example, components for displaying audio/visual media.

Other types of peripheral devices 331 which may be useful to the users of such mobile devices, such as, for example: PDA functionality; memory card reader(s); fingerprint reader(s); image projection device(s); ticket reader(s); etc.

Operating mode selection component 348 which, for example, may be operable to automatically select an appropriate mode of operation based on various parameters and/or upon detection of specific events or conditions such as, for example: the mobile device's current location; identity of current user; user input; system override (e.g., emergency condition detected); proximity to other devices belonging to same group or association; proximity to specific objects, regions, zones, etc. Additionally, the mobile device may be operable to automatically update or switch its current operating mode to the selected mode of operation. The mobile device may also be adapted to automatically modify accessibility of user-accessible features and/or information in response to the updating of its current mode of operation.

According to a specific embodiment, the mobile device may be adapted to implement at least a portion of the features associated with the mobile game service system described in U.S. patent application Ser. No. 10/115,164, which is now U.S. Pat. No. 6,800,029, issued Oct. 5, 2004, (previously incorporated by reference in its entirety). For example. in one embodiment, the mobile device 300 may be comprised of a hand-held game service user interface device (GSUID) and a number of input and output devices. The GSUID is generally comprised of a display screen which may display a number of game service interfaces. These game service interfaces are generated on the display screen by a microprocessor of some type within the GSUID. Examples of a hand-held GSUID which may accommodate the game service interfaces are manufactured by Symbol Technologies, Incorporated of Holtsville, N.Y.

The game service interfaces may be used to provide a variety of game service transactions and gaming operations services. The game service interfaces, including a login interface, an input/output interface, a transaction reconciliation interface, a ticket validation interface, a prize services interfaces, a food services interface, an accommodation services interfaces, a gaming operations interfaces, a multi-game/multi-denomination meter data transfer interface, etc. Each interface may be accessed via a main menu with a number of sub-menus that allow a game service representative to access the different display screens relating to the particular interface. Using the different display screens within a particular interface, the game service representative may perform various operations needed to provide a particular game service. For example, the login interface may allow the game service representative to enter a user identification of some type and verify the user identification with a password. When the display screen is a touch screen, the user may enter the user/operator identification information on a display screen comprising the login interface using the input stylus and/or using the input buttons. Using a menu on the display screen of the login interface, the user may select other display screens relating to the login and registration process. For example, another display screen obtained via a menu on a display screen in the login interface may allow the GSUID to scan a finger print of the game service representative for identification purposes or scan the finger print of a game player.

The user identification information and user validation information may allow the game service representative to access all or some subset of the available game service interfaces available on the GSUID. For example, certain users, after logging into the GSUID (e.g. entering a user identification and a valid user identification information), may be able to access a variety of different interfaces, such as, for example, one or more of: input/output interface, communication interface, food services interface, accommodation services interface, prize service interface, gaming operation services interface, transaction reconciliation interface, voice communication interface, gaming device performance or metering data transfer interface, etc.; and perform a variety of services enabled by such interfaces. While other users may be only be able to access the award ticket validation interface and perform EZ pay ticket validations. The GSUID may also output game service transaction information to a number of different devices (e.g., card reader, printer, storage devices, gaming machines and remote transaction servers, etc.).

In addition to the features described above, various embodiments of mobile devices described herein may also include additional functionality for displaying, in real-time, filtered information to the user based upon a variety of criteria such as, for example, geolocation information, casino data information, player tracking information, etc.

Figure 4:
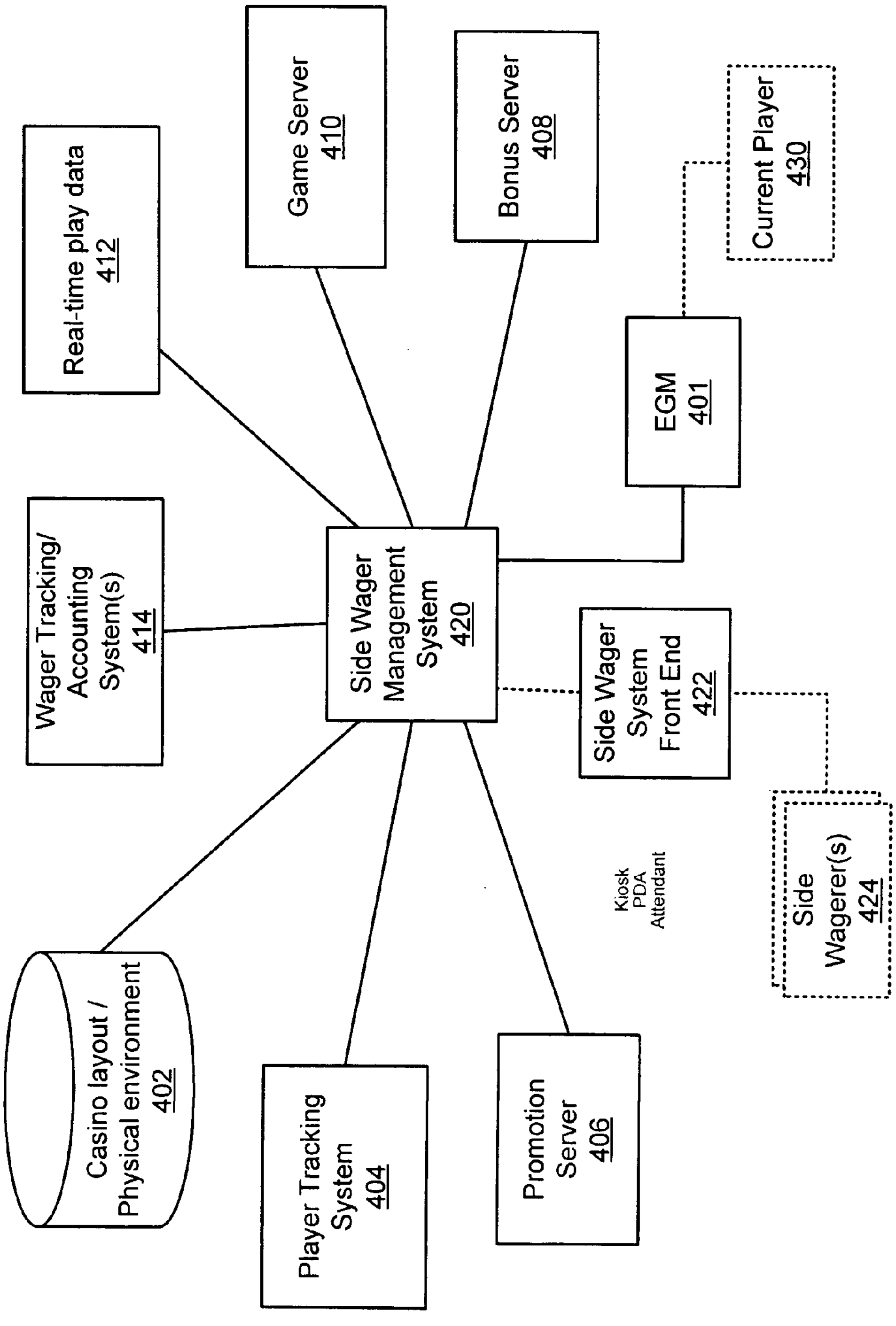
FIG. 4 shows a specific example of an embodiment of a gaming network 400 which may be used for implementing various features.

FIG. 4 shows a specific example of an embodiment of a gaming network 400 which may be used for implementing various features. Descriptions of at least a portion of the various components and/or systems shown in FIG. 4 are also provided in other sections of this application.

As illustrated in the example of FIG. 4, gaming network 400 may include one or more electronic gaming machines (EGMs) 401 for which side wagering functionality has been enabled. Depending upon particular circumstances, a current player 430 may or may not be actively involved in game play at the electronic gaming machine 401.

One or more side wagerers (SWs) 424 (which, for example, may include players and/or other patrons of the casino) may desire to engage in side wagering activity associated with EGM 401. In one embodiment, a side wagerer 424 may communicate with a Side Wager System Front End 422 for conducting side wagering activity related to one or more gaming components (e.g., gaming machines, game tables, EGM 401, etc.). According to different embodiments, the Side Wager System Front End 422 may be implemented via, for example, and EGM, a kiosk, a PDA (or other mobile or handheld device), a casino attendant or employee, etc. For example, in one embodiment, a side wagerer may place a side wager relating to EGM 401 via a PDA, cell phone, specially configured handheld device such as that described, for example, in FIG. 3 of the drawings. According to different implementations, a gaming casino may include a number of different Side Wager System Front End devices. In at least one embodiment, the Side Wager System Front End device may be operable to facilitate side wager activities conducted by one or more side wagerers, and may further be operable to facilitate communication between the side wagerer(s) 424 and the Side Wager Management System 420.

As illustrated in the embodiment of FIG. 4, gaming network 400 includes a Side Wager Management System 420 which is operable to facilitate and/or manage a variety of side wagering activities and/or related information which is conducted in gaming network 400. According to some embodiments, such as that illustrated in FIG. 4, the Side Wager Management System 420 may be operable to communicate with various other components and/or systems of gaming network 400 in order, for example, to carry out operations relating to its various functionalities. As illustrated in the embodiment of FIG. 4, such other components and/or systems may include, but are not necessarily limited to, one or more of the following: promotion server(s) 406, player tracking system(s) 404, casino layout/physical environment system(s) 402, wager tracking/accounting system(s) 414, real-time data tracking system(s) 412, game server(s) 410, bonus server(s) 408, etc.

Figure 5:
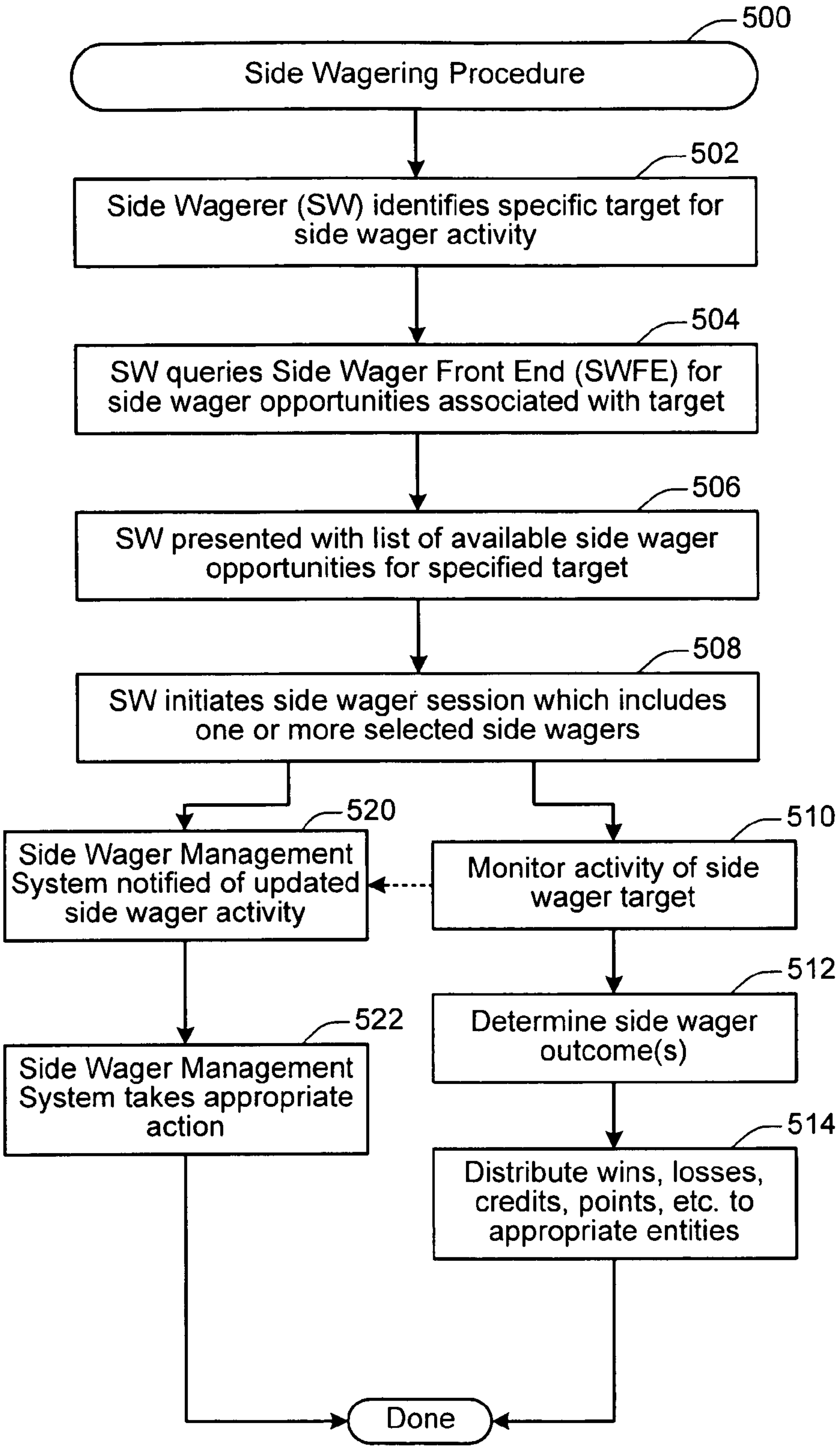
FIG. 5 shows a flow diagram of a side wagering procedure 500 in accordance with a specific embodiment.

FIG. 5 shows a flow diagram of a side wagering procedure 500 in accordance with a specific embodiment. According to various embodiments, at least a portion of the activity described with respect to FIG. 5 may be implemented via one or more gaming network components and/or systems described herein. For purposes of illustration, and in order to avoid confusion, the flow diagram of FIG. 5 will now be described with respect to the gaming network 400 (FIG. 4) of the drawings.

As shown at 502, a side wagerer (SW) (e.g., casino patron, player, spectator, other person, or intelligent machine) may identify one or more specific target(s) for conducting side wager activity. According to various embodiments, such specific targets may include, but are not limited to one or more of the following (or combination thereof): casino players, game tables, EGMs, game themes, game denominations, game paytables, time of day, day of week, type of wager (e.g., max bet vs. non-max bet), wager amount, location within the casino, player rank, etc.

In the specific embodiment of FIG. 5, assuming that the side wagerer (SW) has identified a specific side wager target, the SW may query a Side Wager Front End (SWFE) device in order to determine whether any side wager opportunities are available and/or associated with the specified target. According to different embodiments, the gaming network may include one or more SWFEs, wherein different SWFEs may be implemented via different devices such as, for example, kiosks, PDAs (or other mobile or handheld devices), casino attendants or employees, etc.

For example, in one embodiment, a SW may select a particular EGM (e.g., 401) as a possible side wager target. The SW may then access a SWFE device (such as, for example, the SW's specifically configured PDA) in order to determine whether any side wager opportunities are available and/or associated with the target EGM. According to one embodiment, any gaming device either in use by a player or unused by others may be available for conducting side wager activities therewith. Alternatively, in a different embodiment, the casino may chose to allow only selected EGMs to be available for side wager activities during a specified time period.

In one implementation, a side wagerer may be required to complete a log in process at the SWFE before being able to conduct side wager activities. For carded players and/or those players participating in player tracking, logging in may include entering the player's identification number, swiping his card, or otherwise entering his identification number into the system, be it through the use of an agent, a radio frequency, or any other technology now known or later developed. For uncarded players, the network may establish a temporary uncarded player account and give the player access to the account for the purpose of conducting side wager activities.

According to one embodiment, the SWFE may transmit a request to the Side Wager Management System (e.g., 420) for identifying side wager opportunities associated with specific criteria. For example, in one embodiment, the request may include information relating to the identity of the SW and/or the identity of the selected target. The Side Wager Management System may use the identity of the SW, the identity of the selected target, and/or other criteria to determine available side wager opportunities.

According to different embodiments, the availability of one or more side wager opportunities may be based on a variety of different criteria or combination thereof. Such criteria may include, but are not limited to one or more of the following (or combination thereof): time criteria, date criteria, machine ID criteria, game theme criteria, denomination criteria, paytable criteria, machine activity criteria, player tracking criteria, player ID criteria, location of side wagerer, location of target, wager type criteria (e.g., max wager vs. non max wager), participation criteria (e.g., whether the EGM is currently participating in a progressive jackpot system, for example), etc. According to specific embodiments, each side wager opportunity or event may be characterized a single, or a combination of, discrete states or outcomes that may result with some likelihood of occurrence during the play of the wager-based game.

In another embodiment, the SWFE device(s) may be operable to identify a current user (e.g., current side wagerer) of the SWFE, and to automatically determine a current location or position of the current user on the casino floor. Using the user location information, the SWFE may then query the Side Wager Management System about available side wager opportunities associated with gaming devices (e.g., EGMs) which are within a predetermined proximity to the current location of the user.

In at least one embodiment, the results of the queries performed by the Side Wager Management System may be formatted, filtered, sorted and/or otherwise manipulated according to various criteria and/or constraints. For example, the query output data may be sorted and/or filtered to promote side wager opportunities associated with selected game themes, or to promote side wager opportunities associated with selected EGMs. The manipulated output query data may be presented (506) or displayed to the SW, for example, via the SWFE device. In a particular embodiment, one or more of the available side wager opportunities may each have a respective set of constraints associated therewith which, for example, may relate to various rules governing side wager activities associated with that particular side wager opportunity. For example, side wagering may be allowed for a particular EGM only if the amount of the side wager meets or exceeds a specified wager amount. Other examples include: the EGM's top award amount, the desire of the primary patron (if they choose to allow side wagering on the machine they are interacting with), etc.

At 508 it is assumed that the side wagerer initiates a side wager session which includes one or more selected side wagers. In one embodiment, each side or wager placed by the SW may represent a different side wager activity associated with that particular side wager session. For example, the SW may elect to place or stake a side wager of $100 (cumulative total amount) to mirror the EGM wagering activities of Player A for the next 2 hours. In this example, each time Player A makes a wager on an EGM within the specified 2 hour time period, an identical wager (e.g., for the same game theme, denomination, paytable, etc.) may be automatically placed (e.g., by the Side Wager Management System) on behalf of the SW. Accordingly, in this example, the gross winnings/losses of the SW (over the specified 2 hour time period) should be the same as the gross winnings/losses awarded to Player A during the same 2 hour time period.

According to various embodiments, different types of "currency" may be used to conduct side wager activities including, for example, but not limited to one or more of the following (or combination thereof): cash, credits, tickets, vouchers, coupons, cashless currency, betting chips, tokens, and/or other forms of wagering instruments permitted by a casino or gaming jurisdiction.

According to specific embodiments, the side wagerer may be shown a menu to select side wager opportunities and/or activities. The side wagerer may select a specific side wager target, such as a specific EGM (or any other game being offered by the casino). In at least one embodiment, the side wagerer may log into the side wagering system on an unused EGM, and place a side wager on a different EGM which, for example, may be currently in play by another player.

According to different embodiments, a side wagerer may be presented with opportunities for initiating different types of side wagers based on various criteria such as, for example: a specific player, a specific game theme, a specific wager denomination, a specific paytable, a player rating, a specific machine, a random player, a random machine, a type of player profile, a type of machine profile (such as, for example, a historically "hot" or historically "cold" machine, a player location, a machine location, and/or any other criteria established by the casino.

For example, if the side wagerer wanted to wager on a specific player, like a spouse, the side wagerer could identify the spouse to the SWFE device. Alternatively, if the side wagerer wished to wager on a particular gaming device (e.g., EGM) that appeared to be particularly successful, the side wagerer could provide to the SWFE a device identifier for the EGM (such as its machine ID), or pull up a map of the casino's devices to select the appropriate device.

The selection of a random player or device may be performed by the system using randomizing software. For example, a side wagerer might, for example, choose to place a side wager on a random player's play on a specific EGM.

In embodiments where the side wagerer is relying, at least in part, on the skill of the player(s) on whom side wagers are being placed, it may be preferable for a side wagerer to select a player group that includes more skilled players, perhaps those having a player rating, those achieving a certain win percentage, or those with the most or highest wins presently on the floor. In this way, the side wagerer may place side wager based on the player's profile, rather than a specific or random player.

According to various embodiments, the side wagerer may be presented with different side wager opportunities relating to different side wager types. Examples of various side wager types may include, but are not limited to: a one time wager on a single play of the device, a one time wager on multiple plays of the device (e.g., fixed number of plays, multiple plays during a specified time period, etc.), a repeating wager (e.g., $5 per play), an incremental wager (e.g., where the wager amount increases according to a predefined schedule, such as, for example, an increase of $1/hand), a random wager within a specified range (e.g., a wager amount between $1 and $5), etc.

In specific embodiments where the side wagerer is a registered member of a player tracking system, the tracking system may be operable to make a record of the side wager activity associated with the side wagerer. If the side wagerer is not a member of the player tracking system, the side wagerer may be issued a receipt for a placed side wager, which may be redeemed following a win, if any.

Returning to FIG. 5, assuming that the side wagerer has initiated a side wager session which includes one or more selected side wagers, the initiated side wager session and side wager information may be reported (520) to the Side Wager Management System. Additionally, any updates to existing side wager sessions and/or related information may be transmitted or reported to the Side Wager Management System, for example, in real-time or at periodic intervals. In one embodiment, the Side Wager Management System may be operable to store the side wager session information, for example, at a local storage device and/or at a remote storage location.

In one embodiment, the Side Wager Management System may be operable to analyze the reported side wager session information, and to take appropriate action (522) when necessary. In a specific embodiment, such appropriate action may include, for example: identifying desired side wager target(s) which are (and/or have been) associated with side wager activity, notifying one or more of the identified side wager target(s) that a side wager session has been initiated with respect to that particular target, etc.

In at least one embodiment, the notified target(s) may, in turn, take appropriate action such as, for example, notifying other entities (e.g., players, casino employees, network devices/systems) of selected side wager session status information. One example of this is illustrated in FIG. 7 of the drawings.

Figure 7:
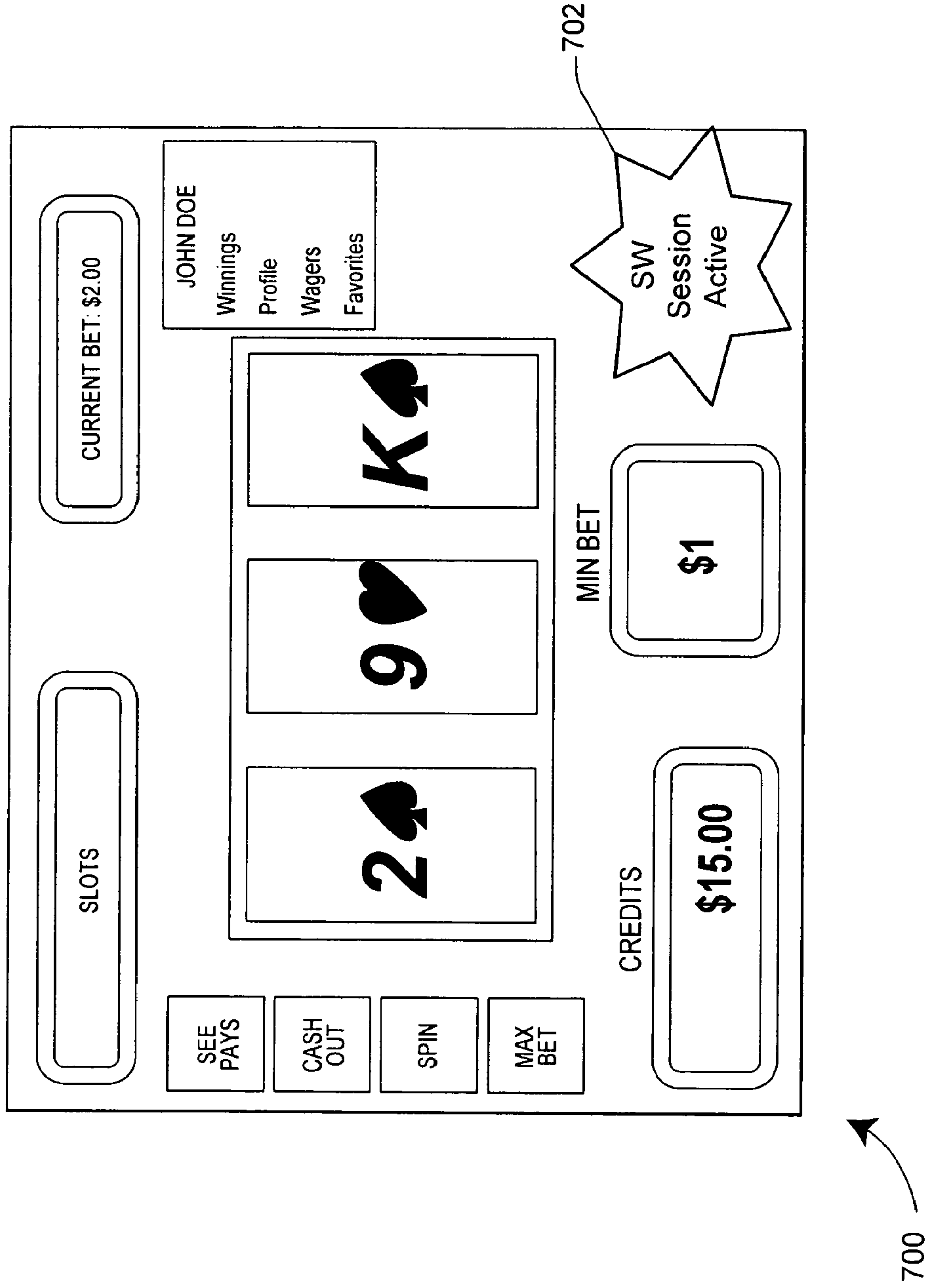
FIG. 7 shows one example of an EGM display 700 in accordance with a specific embodiment.

FIG. 7 shows one example of an EGM display 700 in accordance with a specific embodiment. In the example of FIG. 7, it is assumed that a side wager session has been initiated for a specific EGM target associated with EGM display 700. In one embodiment, the Side Wager Management System may provide the EGM target with side wager session status information relating to the side wager session which has been initiated for that particular target. Such side wager session status information may include, for example, one or more of the following (or combination thereof): side wager session start time, side wager session end time, side wager type, side wagerer identity information, high single win amount, highest side-wager credit amount, lowest side-wager credit amount, number of games played, low number of games abstained (e.g., if betting criteria was not met), number of primary players on the EGM, highest rank of player, win rank as compared to other side-wager players, etc.

According to at least one embodiment, the target EGM may display selected portions of the side wager session status information on EGM display 700. For example, as illustrated in FIG. 7, EGM display 700 may display a side wager status icon 702 which conveys to an observer of the display (e.g., a current player who is playing at the target EGM) that a side wager session is currently active at that particular EGM. In one embodiment, the portion of the display which displays icon 702 may be controlled by one or more remote systems such as, for example, the Side Wager Management System. In one embodiment, a player may select the side wager status icon 702 in order to retrieve additional information relating to the current (and/or previous) side wager session(s) associated with that particular EGM. According to alternate embodiments, it may be desirable to keep at least some aspects of side wager sessions anonymous, for example, so that a target player does not know there is a side wagering session in play. Additionally, in other embodiments it may be desirable to provide players with the option to elect to allow or prevent side wagering during their game play.

Additionally, in at least one embodiment, during the active side wager session, the target EGM (and/or other side wager target device(s)) may be operable to report (e.g., in real time or periodic intervals) current game play status information to an appropriate entity (such as, for example, the Side Wager Management System) in order, for example, to allow side wager activities/events relating to the target EGM to be properly monitored and/or tracked.

Thus, for example, as illustrated in FIG. 5, once a side wager session has been initiated with respect to a selected side wager target, activity and/or in events associated with the selected side wager target may be monitored (510) in order, for example, to properly determine (512) relevant side wager outcomes. According to various embodiments, a variety of different devices and/or systems may be utilized for monitoring activities relating to one or more side wager target(s). Such devices may include, for example: Side Wager Management System(s), EGMs, Side Wager System Front End devices, game play data tracking system(s), etc.

In at least one embodiment, the target device may be operable to transmit or report (e.g., in real time or periodic intervals) the target activity status information to an appropriate entity such as, for example, the Side Wager Management System. In one embodiment, the Side Wager Management System may be operable to monitor (e.g., in real-time) the target activity status information it receives from various side wager targets. Additionally, in at least one embodiment, the Side Wager Management System may be operable to utilize the reported target activity status information to determine (512) side wager outcomes relating to one or more side wager activities.

For example, in one embodiment where a side wager is placed on a specified target EGM, the target EGM may be notified that it is involved in an active side wager session. In response, the target EGM may monitor it's current game play activity and/or other activity at the target EGM (such as, for example, real-time game play data, real-time wager data, coins in, coins out, bonus data, player tracking data, card in, card out, games played, max bet wagers played, other standard accounting meters, etc.). Collectively, such monitored information may herein be referred to as target activity status information.

In an alternate embodiment where the specified side wager target is a specific player on the casino floor, for example, the Side Wager Management System may be operable to communicate with a Player Tracking System (e.g., 404) and/or other systems/devices in the casino network in order to track the location and/or activities of the target player during the active side wager session. Each time the target player engages in game play activities at one or more gaming devices, the activities of the target player may be reported to the Side Wager Management System for monitoring, recording, and/or side wager outcome determination.

For example, if, during the active side wager session, the Player Tracking System detects that the target player has engaged a first EGM for playing video poker, the Player Tracking System may send notification of this event to the Side Wager Management System. In response, the Side Wager Management System may instruct the first EGM to transmit its game play data (and/or other desired information) to the Side Wager Management System for monitoring, recording, and/or side wager outcome determination. Thereafter, if the Player Tracking System detects that the target player has subsequently engaged a second EGM for playing video slots, for example, the second EGM may be instructed to transmit its game play data (and/or other desired information) to the Side Wager Management System for monitoring, recording, forwarding, determining side wager outcomes, etc.

In at least one embodiment, various information relating to the side wagering sessions and/or activities may be tracked and stored (for example, at the Side Wager Management System. Such information may be made available on the gaming network for viewing and/or analysis to various entities, including, for example, but not limited to: players with side wagers placed on them, other players, other side wagerers, casino employees, security, components/systems of the casino gaming network, etc.

According to various embodiments, different network devices/systems may be operable to determine (512) side wager outcomes. For example, in one embodiment, the Side Wager Management System may be operable to determine and/or calculate side wager outcomes (e.g., wins, losses, credits, bonuses, points, rewards, etc.) based, for example, on information relating to the monitored side wager activities.

As shown at 514, the determined/calculated side wager outcomes and/or other related information (e.g., wins, losses, credits, bonuses, points, rewards, promotions, player rating data, etc.) may be distributed to appropriate entities. For example. in one embodiment, the Side Wager Management System may report side wager outcome information (e.g., player ID, side wager information, side wager outcome(s)) to Wager Tracking/Accounting System 414 in order to credit or debit a given side wagerer's account based on specified side wager outcome data. In one embodiment, a portion of the side wagers made and/or offered may be withheld for collection by the gaming establishment (i.e. as a rake).

According to specific embodiments, a side wagerer may be able to select (e.g., via the SWFE) one or more desired notification type(s) for receiving updated information relating to side wager events. For example, in instances where the side wagerer is betting on the outcome of another's play, the side wagerer may not be aware when play ends and the win/loss determined. In a specific embodiment, the side wagerer may select a first notification type which will enable the gaming network to automatically contact the side wagerer following termination of a side wager session and/or specified side wager related activity. For example, in one embodiment, the notification may be through a message (e.g., "Congratulations, you've won") generated by the Side Wager Management System. Different notification types may include, for example: overhead signs, messages on the gaming device, sounds, telephone calls, emails, agent notification, flashing lights, pages, other types of communication and/or any combination thereof.

According to specific embodiments, the side wagerer can monitor play by watching or monitoring the side wager target. In one embodiment, the side wagerer can monitor a specified side wager target's activities via a display on a mobile or handheld device (e.g., 300). Alternatively, the side wagerer may view an overhead image, and/or may monitor by any other visual means available in the casino. The side wagerer may also receive messages via a hand-held device that permit him or her to monitor play in longer lasting games.

When play ends, the side wagerer may be notified of the outcome of play based on a selected notification type. According to one embodiment, the side wagerer may then be given the option to elect to place another side wager, or to "cash out." If the side wagerer decides to make another side wager, the side wagerer may be presented with new side wager opportunities which have been determined based, at least in part, upon data obtained from the side wagerer's previous side wager activities and/or other criteria such as specified preferences. According to specific embodiments, when a side wagerer elects to "cash out," appropriate payouts, winnings, credits, vouchers, etc. may be provided to the side wagerer by one or more entities such as, for example: a gaming machine, a redemption center, a service desk, a SWFE device, and/or any other cashier service provided by the casino. In one embodiment the side wagerer may transfer any accrued credits to a new or existing player account using the machine, a kiosk, and/or any other device providing authorized access to the desired account(s).

Additionally, in at least one embodiment, the Side Wager Management System (and/or other devices/systems) may report other types of side wager-related information to other systems/devices in the gaming network (e.g., 400). For example, the Side Wager Management System may generate a side wager target rating value based on the performance of a selected side wager target (e.g., Player A) during a given side wager session, and may transmit the side wager target rating value to Player Tracking System 404. In one embodiment, Player Tracking System 404 may use the received side wager target rating value to update a side wager performance rating (and/or other player rating type) associated with the specified target (e.g., Player A).

According to specific embodiments, selected players may each be assigned a rating, which may be tracked by the gaming network. Player ratings may be computed (e.g., based on historical data, player tracking data, etc.) which may be associated with past play of the wager-based game by each respective player. As games may be played, the player ratings may also be updated in real-time to reflect recent performance that results in a change in the ratings of one or more players.

According to specific embodiments, player ratings may be employed to inform participants of the wager-based game (e.g. side wagerers) of the relative successfulness of one or more players. Making the player ratings available to observers may facilitate the determination of side wagering decisions. For example, a lower player rating for a specified time period might indicate to an observer that a particular player is not considered a "hot player." In specific embodiments, this may warrant better odds for a wager on the event that the player will actually win a particular tournament, game, hand, etc. Information from player ratings may also be combined with an observer's own knowledge in determining whether a side wager should be made.

Player ratings, when applied to multi-player wager-based games, may also offer several advantages. For example, players may benefit in that an additional feature may be available for tracking individual comparative performance. Player ratings may provide a mechanism that allows observers to make more informed side wagers in wager-based games. The provision of side wagering in wager-based games may benefit both the gaming establishment hosting the wager-based game and observers making successful side wagers with an opportunity for increased revenues.

According to specific embodiments, player ratings may be computed in accordance to a variety of pre-defined algorithms or standards. In one embodiment, a first type of player rating may reflect the relative or absolute ranking of game players. Player ratings may also facilitate the division of players into a number of groups, which, for example, may be used, for example, to organize leagues/tournaments, to create distinctive levels of side wager opportunities, etc.

In one embodiment, each player may be provided with the option of whether his rating will be displayed to other participants. For example, in one embodiment, where player ratings are displayed at the option of the players, the players may be provided with a financial incentive (e.g., by the casino) for enabling the display of their respective player ratings. For example, a portion of profits made by the casino from side wagers may be distributed to players who allow their player ratings to be exposed.

The following examples may help to illustrate various features which may be provided according to different embodiments.

According to a first example, a patron may wish to place a side wager on a particular game that is currently in play by another patron. In one embodiment, the patron approaches a slot attendant and requests to be placed as a side wagerer on the selected machine. The attendant takes the patron's initial buy-in and gives back a receipt. In other embodiments, the side wager may be placed using an automated process, for example, via a SWFE device. In one embodiment, the patron's information and initial buy-in may be stored and adjusted based on the coin in, coin out and jackpot meter movement from the gaming machine. The patron may wish to discontinue the side wagering session at a desired time. Accordingly, the patron may then take the receipt to a redemption station and receive the remaining balance of their stake.

In another example, Patron A chooses to start a side wager session on a 5× Pay $1 slot currently being played by Patron B. Patron A selects his playing criteria (e.g., as described previously), makes a $100 wager for a two hour side wager session, and receives a receipt (e.g., from a SWFE device or agent through which he established the side wager). According to at least one embodiment, during the active side wager session, one or more side wagers may be automatically placed (e.g., by the Side Wager Management System) on behalf of Patron A. For example, in one embodiment, the side wagers which are automatically placed on behalf of Patron A may mirrors the wager(s) which are placed by Patron B at the EGM being played by Patron B.

At the end of the two hours, it may be assumed that Patron B has won $150 over one or more games. Patron A may now redeem his receipt or transfer his winnings to his player account (if available). Depending on parameters established by the casino, Patron A may be allocated a win of $150 (based on the outcome of the side wager session), which matches the winnings of Patron B. Alternatively, depending on parameters established by the casino, Patron A may be allocated a win for a lesser percentage (e.g., in embodiments where the casino takes a percentage or rake), or a greater percentage (e.g., in embodiments where a winnings multiplier is offered as a promotion to the side wagerer). The ratios for the win or loss experienced by the side wagering patron (e.g., Patron A) relative to the win or experienced by the target patron (e.g., Patron B) may be any desired percentage or multiple established by the casino.

According to specific embodiments, multiple concurrent side wager sessions (for multiple side wagerers) may be active for one or more common targets. For example, multiple side wagers may place their own side wagers on Patron B concurrently while the side wager session for Player A is still active. In one embodiment, outcomes for each individual side wager session may be calculated independently of other side wager session outcomes. Thus, in one embodiment, Player A's side wagering stake will increase or decrease based solely on coin in, coin out and the jackpot meter of the EGM played by Patron B.

Also, in at least one implementation, Patron B may not be affected in any way by Patron A having an open side wagering session on either Patron B and/or the EGM which Patron B is playing. In at least one embodiment, Patron B may be unaware that side wagering sessions are active on the games or machines that Patron B is playing. Further, in at least some embodiments, Patron A's session may be unaffected by canceled credits or hopper fills, and may continue throughout such events. In addition, any jackpots that are won on the target EGM may also awarded in some proportional amount to each of the affected side wagerers.

In a different example, Patron A could establish a side wager session that includes the play of Patrons B-F, and his win, if any, would be the result of the combined play of each patron. In a like manner, Patrons A, C, D, and E could each side wager against the play of Patron B. In one embodiment, there may be no limit, other than limitations imposed on the performance of the network, to the number of patrons that a given side wagerer may choose to place a side wager on and/or against during a given side wager session. Certain casinos, however, may prefer to limit the number of side wagers placed against a particular player or machine, and/or to place an upper limit on the amount at stake during a given side wager session to prevent multiple winners of mega jackpots or other high dollar payouts.

According to a specific embodiment, a carded side wagerer with an established player account may be allowed make expedited side wagers based on pre-set criteria customized by the side wagerer. In one example, the side wagerer may log into the system by entering a player tracking number, swiping his card, and/or using any other mechanism available for identifying the side wagerer to the SWFE device (e.g., a biometric, agent assistance, radio signal, etc.) When the side wagerer logs into the player tracking system, the side wager's pre-configured criteria and/or preferences are displayed, and the side wagerer is able to initiate one or more side wager sessions. At the end of a side wager session, the side wagerer may be notified of the outcome of the game, and may be provided with the option to initiate additional side wager sessions, to cash-out, or some combination thereof. If the side wagerer elects to initiate another side wager session, the side wagerer may also have the option to continue using his current pre-configured side wager criteria and/or preferences or to modify them, as desired.

According to specific embodiments, there may be many potential options available to patrons who wish to engage in the side wager activities. For example, an upper cap may be set to automatically end a an active side wager session if it is determined that specified criteria has been satisfied such as, for example, but not limited to, one or more of the following (and/or any combination thereof):

- the total win rises to a specified level;
- the total win rises to a percentage of initial stake;
- the total loss reaches a percentage of initial stake;
- session time expired;
- idle time on an EGM reaches a pre-determined length of time;
- player has discontinued play on the selected EGM;
- player not meeting pre-desired conditions begins play on the selected EGM;
- pre-determined time period (e.g., time of day) is reached;
- etc.

In this way, a side wagering patron may not be required manually track his or her active side wager sessions in order, for example, to determine whether appropriate circumstances have occurred for ending a particular active side wager session.

According to specific embodiments, one or more display screens and/or other visual promotions may be provided, for example, to provide side wager related information to casino patrons. For example, in some embodiments, visual promotions may be provided to entice potential side wagerers to participate in side wager sessions. An example of this is illustrated in FIG. 8 of the drawings.

FIG. 8 shows an example of a promotional display 800 in accordance with the specific embodiment. As illustrated in the example of FIG. 8, promotional display 800 may include a variety of different types of information relating to side wager activities, promotions, etc., such as, for example: promotional text/ads (e.g., 802); information (e.g., 804) relating to active side wager sessions; information (e.g., 806) relating to available side wager opportunities and/or promotions; etc. According to specific embodiments, various types of content displayed on display 800 may include, but are not limited to, one or more of the following (and/or some combination thereof): information relating to side wager session identifiers; information relating to side wager targets; information relating to different types of side wagers; information relating to initial wager criteria; information relating to minimum wager criteria; information relating to current or real-time values of active side wager sessions; information relating to side wager timing criteria; information relating to side wager promotions and/or bonuses; etc. The screen may be displayed on individual gaming displays and overhead displays throughout the casino, and/or may be displayed in one or more salons.

According to specific embodiments, side wagering may be performed by players on the casino floor and/or other locations of the casino using a variety of electronic devices, including, for example, EGMs available for play. Announcements, notifications, and messages can occur via the EGMs, overhead displays, via hand-held computing devices, through casino personnel, etc., According to specific embodiments, it may be desirable to provide side wagering parlors, salons, or stand-alone or sound-proof rooms where numerous people can congregate to wager on their favorite casino game or players. In this environment, the casino can establish a competitive environment where one or more teams compete against other teams to secure the largest winnings based on side wager play, whether on the casino floor or within the salon, while the teams of side wagerers view the action from monitors and displays located within the salon.

According to at least one embodiment, multiple types of wins may be awarded and rewarded by the casino for side wager related activities. Table 1 below provides one example which summarizes different types of events which may represent "wins" in the side wager system. Individual casinos may configure their games to operate as they see fit and/or as are necessary to comply with jurisdictional gaming regulations.

TABLE 1

| Machine Outcome | Side Wagerer Behavior | Other Criteria |
|---|---|---|
| Specific Game Outcomes | Points Earned | Lucky Coin |
| Series of Game Outcomes | Win/Loss Per Unit of Time | Lucky Time |
| Sets of Game Outcomes | Handle Per Unit of Time | Lucky Game |
| Consecutive Game Outcomes | Continuous Play | Random Event |
| X outcomes in N tries | | Other Event |
| Outcome sets/unit time | | |
| Outcomes relative to others | | |

In at least some embodiments, the following definitions may be applied to side wager related activities. In a specific embodiment, one or more of the various types of "wins" defined herein may be associated with (or awarded to) one or more side wagerers who have placed one or more side wagers on specific target player(s) and/or target device(s). Thus, for example, in one embodiment, a side wager win may be awarded to a particular side wagerer upon determining that an appropriate side wager win event has occurred for a target player, device and/or event that is associated with a side wager placed by the side wagerer.

A "Specific Game Outcomes" win event may occur when a target player or device obtains a predefined result in a game. Examples include, for instance, a "four-of-a-kind" (or a particular four, such as four aces) in a poker game, "seven-seven-seven" in a slot game, or obtaining a particular bonus symbol on one of the reels. An award may be generated when any particular predefined outcome of the game is met, for instance during a specified time period.

A "Series of Game Outcomes" win event may occur when a target player or device obtains certain results during multiple plays on the gaming machine or series of gaming machines in a predetermined order. One example may be where a target player (or target EGM) obtains, on a video poker machine, a pair, two pairs, three-of-a kind, straight, and flush, in that order but not necessarily consecutively. An award may be generated when any predefined series of results is met, for instance during a specified time period.

A "Sets of Game Outcomes" win event may occur when a target player or device obtains certain results during multiple plays one or more gaming machines regardless of order. Examples include a target player (or target EGM) receiving a fourth four-of-a-kind on a video poker machine, a target player (or target EGM) obtaining jackpot payouts on each of the possible paylines in a slot-based game, etc. An award may be generated when the last in the predefined set of results is met, for instance during a specified time period.

A "Consecutive Game Outcomes" win event may occur when a target player or device obtains certain consecutive results during multiple plays on one or more gaming machines. Examples include a target player (or target EGM) obtaining a win on five consecutive hands, a target player (or target EGM) obtaining a win on two consecutive hands containing a minimum level of win (such as, for example, three-of-a-kind) on a video poker machine, a target player (or target EGM) obtaining a particular bonus symbol on the payline of a slot machine three consecutive times, etc. An award may be generated when the last of the predefined consecutive game outcomes is met, such as, for example, when the target player (or target EGM) obtains particular outcomes during a specified time period.

An "X Outcomes in N Tries" win event may occur when a target player or device obtains certain results during multiple plays on one or more gaming machines within a certain number of tries. Examples include a target player (or target EGM) obtaining both a straight and a flush within five games of one another, but not necessarily consecutively or in that order. Another example may be where a target player (or target EGM) obtains seven-seven-seven during the first 50 plays of a particular slot machine. An award may be generated when the "xth" outcome may be reached by the target player (or target EGM), for instance during a specified time period.

An "Outcome Sets/Unit Time" win event may occur when a target player or device obtains certain results during multiple plays on one or more gaming machines primary game within a set period of time. Examples include a target player (or target EGM) obtaining 10 jackpot awards on a slot machine within a ten minute period, a target player (or target EGM) obtaining three flushes within a one-hour period on a video poker machine, a target player having the most awards as of a specified time, etc.

An "Outcomes Relative to Others" win event may occur when a target player or device obtains a certain result or results on one or more gaming devices before (or after) other players at a specified group of games, for example during the period of a bonus cycle or tournament play. Examples include the target player (or target EGM) with the highest or lowest rank or rating of a selected group of players and/or EGMs as of a specified time.

A "Points Earned" win event may occur when a target player or device earns a certain number of points on one or more gaming devices, such as, for example: bonus points, extra credit points, machine credits, promotional credits, etc. An award may be generated for example to the side wagerer with the most points as of a specified time.

A "Win/Loss Per Unit of Time" win event may occur when a target player or device obtains a certain number of wins or loses on one or more gaming devices over a predetermined time period. Examples include a target player (or target EGM) losing 100 times over a 20 minute time period, winning 7 times over a one-minute period, having the most wins or losses during a specified time period, etc.

A "Handle Per Unit of Time" win event may occur when a target player or devices bets a certain amount over a certain time period on one or more machines. Examples include a target player betting at least a total of $500 at a slot machine over a one-hour period, a target player betting his/her $1000^{th}$ coin at a nickel poker machine, 500 spins occurring at a target EGM over a specified time period, a target EGM with the largest handle during a specified time period, etc.

A "Continuous Play" win event may occur when a target player or device has continuously played on a machine, or series of machines, for a specified amount of time. For example, the award might be given to a target player (or target EGM) with the most continuous play during a specified time period.

A "Lucky Coin" win event may occur when a target player inserts (or a target EGM has inserted therein) an $x^{th}$ coin-in on a certain pre-designated portion of the games coupled to the gaming network. An award may be generated when the coin is inserted or credit otherwise transferred. For instance, the target player inserting the $x^{th}$ coin during a specified time period.

A "Lucky Time" win event may occur for a target player or device playing at a designated time or randomly selected time of day.

A "Lucky Game" win event may occur for a target player or device that may be engaged in a preselected or randomly selected game theme at one or more gaming devices coupled to the gaming network.

A "Random Event" win event may occur based on randomly selected criteria.

A "Other Event" win event may occur based on one or more events occurring which meet predetermined or selected criteria.

It will be appreciated that the above-described terms represent only a small sample of potential types of wins that may be contemplated, and that other embodiments may differ from those disclosed and described herein. Additionally, in at least one embodiment, a side wager may also be based on and/or related to game play activity conducted by the side wagerer. Other embodiments could conceivably use any data accessible anywhere within the casino and/or gaming network.

According to specific embodiments, winning outcomes need not be applied uniformly to all of the different types of possible side wager targets of the gaming network. For example, there may be different side wager winning events for different groups of gaming devices. For example, a first set of winning events could apply to one group of EGMs, but not to a second group of EGMs. As an illustrative example, there could be a winning event implemented, such as generating a drawing ticket after "x" minutes of play, where "x" may be 40 minutes for EGMs of Group A, 50 minutes for EGMs of Group B, and 60 minutes for EGMs of Group C. In at least some embodiments, one or more of the EGMs within the gaming network could have associated therewith one or more side wager related wining events that are different from other side wager related winning events associated with other EGMs in the gaming network.

In at least some embodiments, there may be different side wager winning events available to persons or groups of people (such as, for example, individual side wagerers and/or side wagerer groupings). For instance, certain side wager related winning events could be set up for specific side wagerers who have signed up for player tracking, while another set of winning events may be applied to other side wagerers and/or patrons.

Using one or more of the various techniques described herein, casinos may increase player wagering activities during desired time periods. Additionally, using one or more of the various techniques described herein, casinos may provide incentives and mechanisms for increasing player gaming activities on less frequently played EGMs, and/or for increasing access to other types of wagers available in the casino. For example, according to one embodiment, by allowing side wagerers to use otherwise stagnant machines to initiate and perform side wager activities relating to more popular EGMs and/or game themes, casinos may increase gaming opportunities for players (e.g., side wagerers), even during peak hours or when the popular EGMs machines are already in play, and realize greater revenues.

Further, in at least one embodiment, casinos may advertise side wagering opportunities in advance, and may also promote to players and/or potential side wagerers that sufficient gaming resources exist for players to wager on their EGM (or other target) of choice, even during peak hours. This, in turn, may help to create a more interactive and entertaining environment for players, including, for example, players who may prefer salon wagering environments. As a result, casinos may be able to appeal to a wider variety of players, including those who would like to socialize while simultaneously participating in wagering opportunities on the casino floor. Further, by being able to accommodate more players using fewer machines, casinos can maximize their profits while minimizing the concomitant overhead.

In some embodiments, it may be preferable to permit side wagering only on selected EGMs which match predefined criteria such as, for example, various criteria described herein.

Various techniques described herein may be used to enable a casino to substantially increase handle on games without necessarily increasing the actual number of games themselves. Further, different embodiments may be used in conjunction with player tracking devices or other devices in order, for example, to allow patrons who are side wagering to be awarded points, bonuses, comps, and/or other promotions based on their side wagering activities and/or game play activities. In one embodiment, side wagering sessions may be tracked, monitored, and/or audited using automated mechanisms, manual mechanisms, and/or some combination thereof.

According to specific embodiments, one or more signals may be sent between the Side Wager Management System and one or more EGMs which have been identified as being associated with the side wager session. For example, in one embodiment, an EGM may be remotely triggered activate a "side wager reporting" mode which causes the EGM to transmit (e.g., to the Side Wager Management System) game play related information such as, for example, the number of coins bet, the number of coins won, the amount of a jackpot hit (if any) during specific game cycles, accounting meter data, and/or any other desired information accessible by the EGM. In some embodiments, the SWMS may use at least a portion of this information to update the side wagerer's database record.

According to a specific embodiment, if at any point the side wagerer's stake reaches zero, the record may be marked "inactive" and will be updated with a timestamp marking the completed time, number of games played, etc., if desired. However, if the side wagerer's stake reflects a positive monetary value, the received updates from the appropriate EGMs may be used to update the side wagerer's record (e.g., by increasing or decreasing the side wagerer's stake, as appropriate). This may continue until some event occurs for ending the side wager session (such as, for example, side wagerer's account value reaches zero, side wagerer's account value reaches a pre-determined value, player elects to end session, end session time reached, etc.).

It will be appreciated that various side wager related embodiments described herein may provide a number of features, benefits and/or advantages. At least a portion of such features, benefits and/or advantages are describe below.

For example, one feature relates to the ability for patrons to participate in wagering activities for any desired gaming machine, even if the desired gaming machine is currently being used by another player. Another feature relates to the ability for side wagering activity to be conducted by patrons from different physical locations. For example, in one embodiment, a patron who wishes to place a side wager on a particular target EGM may not need to be physically present at or near the target EGM in order for the side wager to be placed, and the side wager session to be activated/started. Similarly, the side wagering patron need not be physically present at the target EGM to collect his or her winnings.

Another feature relates to the ability for side wagering enrollment, placement and/or redemption activities to be implemented using wireless technology. Such wireless technology may also allow floor persons to identify, approach, and/or offer selected patrons (e.g., patrons waiting to play a particular game or machine) an opportunity to currently or timely place one or more side wagers on the current game.

Another feature relates to the ability for allowing one or more patrons to concurrently place separate wagers on the same gaming machine.

Another feature relates to the ability for allowing one or more patrons to concurrently "play" (e.g., via side wager mechanisms) the same desired gaming machine, without worry about potentially unskilled player(s) affecting their winnings in an adverse way. Such functionality may be provided, for example, in specific embodiments where the EGMs are configured as "games of chance" in which skill of the current player has very little to no effect on the outcome.

According to various embodiments, patrons who choose to participate in side wagering activities on EGMs may be allowed to make their choices based on one or more different options or criteria such as, for example, but not limited to, one or more of the following (or some combination thereof): machine ID; game theme; player ID; denomination(s); paytable(s); personality of the EGM(s); maximum wager allowed; time of day; locations of EGM(s) within the casino; an EGM's theoretical payback; an EGM's actual payback within a specified time period (e.g., month, week, day, hours, etc.); the popularity of an EGM for various types of patrons (e.g., side wagerers, actual players, registered player tracking members, high rollers, etc.); size of jackpot available; wager type criteria (e.g., max wager vs. non max wager); participation criteria (such as, for example, whether the EGM is currently participating in a progressive jackpot system); etc.

Another feature relates to the ability for allowing casinos to offer targeted bonuses to potential side wagering patrons in order, for example, to increase handle on EGMs that are underperforming.

Another feature relates to the ability for allowing casinos to cap jackpot amounts for side wager sessions, which may further increase casino revenue.

Another feature relates to the ability for allowing unclaimed money within the system (e.g., money relating to side wager wins) to expire after a predetermined time period. In one embodiment, after the expiration of an unclaimed side wager win, the casino may claim the unclaimed money.

Another feature relates to the ability for allowing casinos to offer different point accrual rates for side wagering patrons. Such a feature may be used, for example, to lower the cost per player. For example, in one embodiment, a primary player may accrue points based on a first criteria set (e.g., one point per dollar of wager), while side wagering patrons may accrue points based on a second criteria set (e.g., 2 points per 3 dollars wagered). In this particular example, the overall liability to those patrons who are side wagering patrons may be less the overall liability to primary players.

Another feature relates to the ability for allowing casinos to provide selected patron access to dedicated rooms which may be used to engage in side wager related activities.

It will be appreciated that one advantage of the various side wager related techniques described herein relates to the ability for new ways for a casino to generate additional revenue. For example, increasing play on EGMs with known payback percentages increases win.

Another advantage relates to the ability for casinos to increase income without adding new EGMs, since, for example, according to at least some embodiments, it may be possible for casinos to at full utilization (e.g., all EGMs are in play) while concurrently allowing side wagers to be placed.

Further, another advantage relates to the ability for casinos to achieve increased income without necessarily increasing other related expenses such as, for example, maintenance expenses (which, for example, may be increased if additional physical EGMs were added to the casino floor).

Another advantage relates to increased marketing opportunities which are available to casinos. For example, according to specific embodiments, a casino may offer free meals, bonus cash, points and/or promotional items to entice patrons to engage in side wager activities.

Other Network Embodiments

Figure 6:
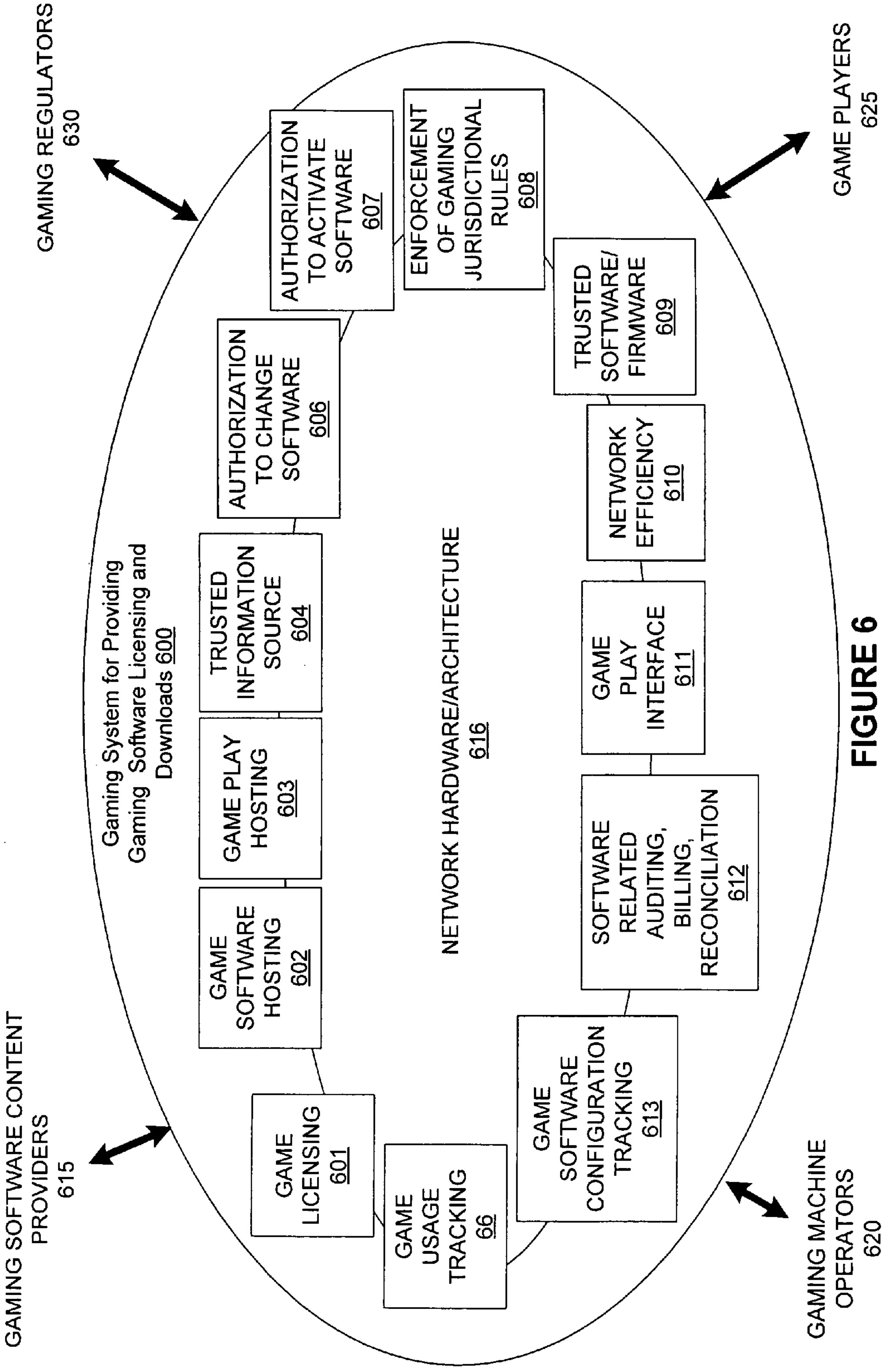
FIG. 6 shows a block diagram illustrating components of a gaming system 600 which may be used for implementing various aspects of example embodiments.

FIG. 6 shows a block diagram illustrating components of a gaming system 600 which may be used for implementing various aspects of example embodiments. In FIG. 6, the components of a gaming system 600 for providing game software licensing and downloads are described functionally. The described functions may be instantiated in hardware, firmware and/or software and executed on a suitable device. In the system 600, there may be many instances of the same function, such as multiple game play interfaces 611. Nevertheless, in FIG. 6, only one instance of each function is shown. The functions of the components may be combined. For example, a single device may comprise the game play interface 611 and include trusted memory devices or sources 609.

The gaming system 600 may receive inputs from different groups/entities and output various services and or information to these groups/entities. For example, game players 625 primarily input cash or indicia of credit into the system, make game selections that trigger software downloads, and receive entertainment in exchange for their inputs. Game software content providers provide game software for the system and may receive compensation for the content they provide based on licensing agreements with the gaming machine operators. Gaming machine operators select game software for distribution, distribute the game software on the gaming devices in the system 600, receive revenue for the use of their software and compensate the gaming machine operators. The gaming regulators 630 may provide rules and regulations that must be applied to the gaming system and may receive reports and other information confirming that rules are being obeyed.

In the following paragraphs, details of each component and some of the interactions between the components are described with respect to FIG. 6. The game software license host 601 may be a server connected to a number of remote gaming devices that provides licensing services to the remote gaming devices. For example, in other embodiments, the license host 601 may 1) receive token requests for tokens used to activate software executed on the remote gaming devices, 2) send tokens to the remote gaming devices, 3) track token usage and 4) grant and/or renew software licenses for software executed on the remote gaming devices. The token usage may be used in utility based licensing schemes, such as a pay-per-use scheme.

In another embodiment, a game usage-tracking host 615 may track the usage of game software on a plurality of devices in communication with the host. The game usage-tracking host 615 may be in communication with a plurality of game play hosts and gaming machines. From the game play hosts and gaming machines, the game usage tracking host 615 may receive updates of an amount that each game available for play on the devices has been played and on amount that has been wagered per game. This information may be stored in a database and used for billing according to methods described in a utility based licensing agreement.

The game software host 602 may provide game software downloads, such as downloads of game software or game firmware, to various devious in the game system 600. For example, when the software to generate the game is not available on the game play interface 611, the game software host 602 may download software to generate a selected game of chance played on the game play interface. Further, the game software host 602 may download new game content to a plurality of gaming machines via a request from a gaming machine operator.

In one embodiment, the game software host 602 may also be a game software configuration-tracking host 613. The function of the game software configuration-tracking host is to keep records of software configurations and/or hardware configurations for a plurality of devices in communication with the host (e.g., denominations, number of paylines, paytables, max/min bets). Details of a game software host and a game software configuration host that may be used with example embodiments are described in co-pending U.S. Pat. No. 6,645,077, by Rowe, entitled, "Gaming Terminal Data Repository and Information System," filed Dec. 21, 2000, which is incorporated herein in its entirety and for all purposes.

A game play host device 603 may be a host server connected to a plurality of remote clients that generates games of chance that are displayed on a plurality of remote game play interfaces 611. For example, the game play host device 603 may be a server that provides central determination for a bingo game play played on a plurality of connected game play interfaces 611. As another example, the game play host device 603 may generate games of chance, such as slot games or video card games, for display on a remote client. A game player using the remote client may be able to select from a number of games that are provided on the client by the host device 603. The game play host device 603 may receive game software management services, such as receiving downloads of new game software, from the game software host 602 and may receive game software licensing services, such as the granting or renewing of software licenses for software executed on the device 603, from the game license host 601.

In particular embodiments, the game play interfaces or other gaming devices in the gaming system 600 may be portable devices, such as electronic tokens, cell phones, smart cards, tablet PC's and PDA's. The portable devices may support wireless communications and thus, may be referred to as wireless mobile devices. The network hardware architecture 616 may be enabled to support communications between wireless mobile devices and other gaming devices in gaming system. In one embodiment, the wireless mobile devices may be used to play games of chance.

The gaming system 600 may use a number of trusted information sources. Trusted information sources 604 may be devices, such as servers, that provide information used to authenticate/activate other pieces of information. CRC values used to authenticate software, license tokens used to allow the use of software or product activation codes used to activate to software are examples of trusted information that might be provided from a trusted information source 604. Trusted information sources may be a memory device, such as an EPROM, that includes trusted information used to authenticate other information. For example, a game play interface 611 may store a private encryption key in a trusted memory device that is used in a private key-public key encryption scheme to authenticate information from another gaming device.

When a trusted information source 604 is in communication with a remote device via a network, the remote device will employ a verification scheme to verify the identity of the trusted information source. For example, the trusted information source and the remote device may exchange information using public and private encryption keys to verify each other's identities. In another example of an embodiment, the remote device and the trusted information source may engage in methods using zero knowledge proofs to authenticate each of their respective identities. Details of zero knowledge proofs that may be used with example embodiments are described in US publication no. 2003/0203756, by Jackson, filed on Apr. 25, 2002 and entitled, "Authentication in a Secure Computerized Gaming System, which is incorporated herein in its entirety and for all purposes.

Gaming devices storing trusted information might utilize apparatus or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

The gaming system 600 of example embodiments may include devices 606 that provide authorization to download software from a first device to a second device and devices 607 that provide activation codes or information that allow downloaded software to be activated. The devices, 606 and 607, may be remote servers and may also be trusted information sources. One example of a method of providing product activation codes that may be used with example embodiments is describes in previously incorporated U.S. Pat. No. 6,264,561.

A device 606 that monitors a plurality of gaming devices to determine adherence of the devices to gaming jurisdictional rules 608 may be included in the system 600. In one embodiment, a gaming jurisdictional rule server may scan software and the configurations of the software on a number of gaming devices in communication with the gaming rule server to determine whether the software on the gaming devices is valid for use in the gaming jurisdiction where the gaming device is located. For example, the gaming rule server may request a digital signature, such as CRC's, of particular software components and compare them with an approved digital signature value stored on the gaming jurisdictional rule server.

Further, the gaming jurisdictional rule server may scan the remote gaming device to determine whether the software is configured in a manner that is acceptable to the gaming jurisdiction where the gaming device is located. For example, a maximum bet limit may vary from jurisdiction to jurisdiction and the rule enforcement server may scan a gaming device to determine its current software configuration and its location and then compare the configuration on the gaming device with approved parameters for its location.

A gaming jurisdiction may include rules that describe how game software may be downloaded and licensed. The gaming jurisdictional rule server may scan download transaction records and licensing records on a gaming device to determine whether the download and licensing was carried out in a manner that is acceptable to the gaming jurisdiction in which the gaming device is located. In general, the game jurisdictional rule server may be utilized to confirm compliance to any gaming rules passed by a gaming jurisdiction when the information needed to determine rule compliance is remotely accessible to the server.

Game software, firmware or hardware residing a particular gaming device may also be used to check for compliance with local gaming jurisdictional rules. In one embodiment, when a gaming device is installed in a particular gaming jurisdiction, a software program including jurisdiction rule information may be downloaded to a secure memory location on a gaming machine or the jurisdiction rule information may be downloaded as data and utilized by a program on the gaming machine. The software program and/or jurisdiction rule information may used to check the gaming device software and software configurations for compliance with local gaming jurisdictional rules. In another embodiment, the software program for ensuring compliance and jurisdictional information may be installed in the gaming machine prior to its shipping, such as at the factory where the gaming machine is manufactured.

The gaming devices in game system 600 may utilize trusted software and/or trusted firmware. Trusted firmware/software is trusted in the sense that is used with the assumption that it has not been tampered with. For instance, trusted software/firmware may be used to authenticate other game software or processes executing on a gaming device. As an example, trusted encryption programs and authentication programs may be stored on an EPROM on the gaming machine or encoded into a specialized encryption chip. As another example, trusted game software, i.e., game software approved for use on gaming devices by a local gaming jurisdiction may be required on gaming devices on the gaming machine.

In example embodiments, the devices may be connected by a network 616 with different types of hardware using different hardware architectures. Game software may be quite large and frequent downloads can place a significant burden on a network, which may slow information transfer speeds on the network. For game-on-demand services that require frequent downloads of game software in a network, efficient downloading is essential for the service to viable. Thus, in example embodiments, network efficient devices 610 may be used to actively monitor and maintain network efficiency. For instance, software locators may be used to locate nearby locations of game software for peer-to-peer transfers of game software. In another example, network traffic may be monitored and downloads may be actively rerouted to maintain network efficiency.

One or more devices in example embodiments may provide game software and game licensing related auditing, billing and reconciliation reports to server 612. For example, a software licensing billing server may generate a bill for a gaming device operator based upon a usage of games over a time period on the gaming devices owned by the operator. In another example, a software auditing server may provide reports on game software downloads to various gaming devices in the gaming system 600 and current configurations of the game software on these gaming devices.

At particular time intervals, the software auditing server 612 may also request software configurations from a number of gaming devices in the gaming system. The server may then reconcile the software configuration on each gaming device. In one embodiment, the software auditing server 612 may store a record of software configurations on each gaming device at particular times and a record of software download transactions that have occurred on the device. By applying each of the recorded game software download transactions since a selected time to the software configuration recorded at the selected time, a software configuration is obtained. The software auditing server may compare the software configuration derived from applying these transactions on a gaming device with a current software configuration obtained from the gaming device. After the comparison, the software-auditing server may generate a reconciliation report that confirms that the download transaction records are consistent with the current software configuration on the device. The report may also identify any inconsistencies. In another embodiment, both the gaming device and the software auditing server may store a record of the download transactions that have occurred on the gaming device and the software auditing server may reconcile these records.

There are many possible interactions between the components described with respect to FIG. 6. Many of the interactions are coupled. For example, methods used for game licensing may affect methods used for game downloading and vice versa. For the purposes of explanation, details of a few possible interactions between the components of the system 600 relating to software licensing and software downloads have been described. The descriptions are selected to illustrate particular interactions in the game system 600. These descriptions are provided for the purposes of explanation only and are not intended to limit the scope of example embodiments described herein.

Although several preferred embodiments of this invention have been described in detail herein with reference to the accompanying drawings, it is to be understood that the invention is not limited to these precise embodiments, and that various changes and modifications may be effected therein by one skilled in the art without departing from the scope of spirit of the invention as defined in the appended claims.

It is claimed:

1. A system for facilitating side wagering activities conducted at a casino, the casino including a casino gaming network, the gaming network including a plurality of gaming machines, including a first gaming machine, the system comprising:

at least one processor;

at least one interface operable to provide a communication link to at least one other network device in gaming network; and memory;

the system being operable to:

receive first side wager request for placing a first side wager relating to a first gaming machine;

determine an identity of a first player associated with generating the first side wager request;

determine at least one side wager opportunity available to the first player based on the identity of the first player; and automatically initiate a first side wager session, wherein the initiation of the first side wager session includes:

automatically place the first side wager at the casino gaming network, wherein the first side wager includes first side wager criteria; and associate the placed first side wager with the identified first player;

wherein a first criteria of the first side wager specifies that an outcome of the first side wager is related to at least one event associated with game play at the first gaming machine.

2. The system of claim 1 wherein the first player is different from a second player who is engaged in game play activities at the first gaming machine at a time when the first side wager was placed.

3. The system of claim 1 wherein the first player corresponds to a non-primary player of the first gaming machine.

4. The system of claim 1 wherein control of game play decisions at the first gaming machine is unavailable to the first player.

5. The system of claim 1 wherein control of wagering decisions at the first gaming machine is unavailable to the first player.

6. The system of claim 1 being further operable to:

determine a current location of the first player within the casino; and determine at least one available side wager opportunity using information relating to the current location of the first player within the casino.

7. The system of claim 1 being further operable to:

detect wagering activity at the first gaming machine that is being conducted by a second player different from the first player;

automatically identify a first wager placed at the first gaming machine by the second player, the first wager including first wager criteria; and automatically generate the first side wager using the first wager criteria.

8. The system of claim 1 being further operable to:

detect that the first gaming machine is currently being used by a second player different from the first player; and providing side wager opportunity information to the first side wager, the side wager opportunity information including information relating to at least one available opportunity for placing a side wager on game play associated with the first gaming machine.

9. The system of claim 1 being further operable to:

receive second side wager request for placing a second side wager relating to the first gaming machine;

determine an identity of a second player associated with generating the second side wager request; and automatically initiate, concurrently while the first side wager session is active, a second side wager session, wherein the initiation of the second side wager session includes:

automatically place the second side wager at the casino gaming network, wherein the second side wager includes second side wager criteria; and associate the placed second side wager with the identified second player;

wherein a second criteria of the second side wager specifies that an outcome of the second side wager is related to at least one event associated with game play at the first gaming machine.

10. The system of claim 1 wherein the first side wager relates to a wager on a game of chance being played at the first gaming machine.

11. The system of claim 1 being further operable to:

identify the first gaming machine as a side wager candidate for which one or more side wagers may be placed;

automatically determine at least one available side wager opportunity for placing a side wager on game play associated with the first gaming machine; and automatically provide side wager opportunity information to the first side wager, the side wager opportunity information including information relating to the at least one available side wager opportunity.

12. The system of claim 1 being further operable to:

provide a second player who is engaged in game play activities at the first gaming machine with an option to elect to allow or prevent side wagering during game play.

13. The system of claim 1 being further operable to:

provide a rating for a second player who is engaged in game play activities at the first gaming machine such that the first player is able to determine a skill level of the second player.

14. The system of claim 13 being further operable to:

vary the odds of a side wager based on the rating for the second player.

15. A method for facilitating side wagering activities conducted at a casino, the casino including a casino gaming network, the gaming network including a plurality of gaming machines, including a first gaming machine, the method comprising:

receiving first side wager request for placing a first side wager relating to a first gaming machine;

determining an identity of a first player associated with generating the first side wager request;

determining a current location of the first player within the casino;

determining at least one available side wager opportunity based on the current location of the first player within the casino; and automatically initiating a first side wager session, wherein the initiation of the first side wager session includes:

automatically placing the first side wager at the casino gaming network, wherein the first side wager includes first side wager criteria; and associating the placed first side wager with the identified first player;

wherein a first criteria of the first side wager specifies that an outcome of the first side wager is related to at least one event associated with game play at the first gaming machine.

16. The method of claim 15 wherein the first player is different from a second player who is engaged in game play activities at the first gaming machine at a time when the first side wager was placed.

17. The method of claim 15 wherein the first player corresponds to a non-primary player of the first gaming machine.

18. The method of claim 15 wherein control of game play decisions at the first gaming machine is unavailable to the first player.

19. The method of claim 15 wherein control of wagering decisions at the first gaming machine is unavailable to the first player.

20. The method of claim 15 further comprising:

determining at least one available side wager opportunity using information relating to the identity of the first player.

21. The method of claim 15 further comprising:
detecting wagering activity at the first gaming machine that is being conducted by a second player different from the first player;
automatically identifying a first wager placed at the first gaming machine by the second player, the first wager including first wager criteria; and
automatically generating the first side wager using the first wager criteria.

22. The method of claim 15 further comprising:
detecting that the first gaming machine is currently being used by a second player different from the first player; and
providing side wager opportunity information to the first side wager, the side wager opportunity information including information relating to at least one available opportunity for placing a side wager on game play associated with the first gaming machine.

23. The method of claim 15 further comprising:
receiving second side wager request for placing a second side wager relating to the first gaming machine;
determining an identity of a second player associated with generating the second side wager request; and
automatically initiating, concurrently while the first side wager session is active, a second side wager session, wherein the initiation of the second side wager session includes:
automatically placing the second side wager at the casino gaming network, wherein the second side wager includes second side wager criteria; and
associating the placed second side wager with the identified second player;
wherein a second criteria of the second side wager specifies that an outcome of the second side wager is related to at least one event associated with game play at the first gaming machine.

24. The method of claim 15 wherein the first side wager relates to a wager on a game of chance being played at the first gaming machine.

25. The method of claim 15 further comprising:
identifying the first gaming machine as a side wager candidate for which one or more side wagers may be placed;
determining at least one available side wager opportunity for placing a side wager on game play associated with the first gaming machine; and
providing side wager opportunity information to the first side wager, the side wager opportunity information including information relating to the at least one available side wager opportunity.

26. The method of claim 15 further comprising:
tracking side wagering activities of the first player and allowing the first player to make expedited side wagers based on pre-set criteria selected by the first player.

27. A handheld device for facilitating side wagering activities conducted at a casino, the casino including a casino gaming network, the gaming network including a plurality of gaming machines, including a first gaming machine, the handheld device comprising:
at least one processor;
at least one interface operable to provide a communication link to at least one other network device in the gaming network; and
memory;
the handheld device being operable to:
receive, via the first handheld device, a first side wager request for placing a first side wager relating to a first gaming machine;
determine a unique identifier for use in identifying a first player associated with generating the first side wager request;
automatically determine a current location of the handheld device within the casino;
automatically determine at least one available side wager opportunity based on the current location of the handheld device within the casino;
automatically perform at least one operation for facilitating initiation of a first side wager session;
automatically perform at least one operation for facilitating placement of the first side wager at the casino gaming network; and
automatically perform at least one operation for facilitating association to be formed between the placed first side wager and the identified first player;
wherein the first side wager includes first side wager criteria includes a first criteria specifying that an outcome of the first side wager is related to at least one event associated with game play at the first gaming machine.

28. The handheld device of claim 27 wherein the first player corresponds to a non-primary player of the first gaming machine.

29. The handheld device of claim 27 wherein control of game play decisions at the first gaming machine is unavailable to the first player.

30. The handheld device of claim 27 wherein control of wagering decisions at the first gaming machine is unavailable to the first player.

31. The handheld device of claim 27 being further operable to:
automatically identify the first gaming machine as a side wager candidate for which one or more side wagers may be placed;
automatically determine at least one available side wager opportunity for placing a side wager on game play associated with the first gaming machine; and
provide side wager opportunity information to the first side wager, the side wager opportunity information including information relating to the at least one available side wager opportunity.

32. A method for facilitating side wagering activities conducted at a casino, the casino including a casino gaming network, the gaming network including a plurality of gaming machines, including a first gaming machine, the gaming network further including a first wireless handheld device operable to facilitate side wagering activities, the method comprising:
receiving, via the first handheld device, a first side wager request for placing a first side wager relating to a first gaming machine;
determining a unique identifier for use in identifying a first player associated with generating the first side wager request;
determining a current location of the handheld device within the casino;
determining at least one available side wager opportunity based on the current location of the handheld device within the casino;
automatically performing, at the first handheld device, at least one operation for initiating a first side wager session, wherein the initiation of the first side wager session includes placing the first side wager at the casino gaming network, and associating the placed first side wager with the identified first player; and wherein the first side wager includes first side wager criteria includes a first criteria specifying that an outcome of the first side wager is related to at least one event associated with game play at the first gaming machine.

33. The method of claim 32 wherein the first player corresponds to a non-primary player of the first gaming machine.

34. The method of claim 32 wherein control of game play decisions at the first gaming machine is unavailable to the first player.

35. The method of claim 32 wherein control of wagering decisions at the first gaming machine is unavailable to the first player.

36. The method of claim 32 further comprising:

identifying the first gaming machine as a side wager candidate for which one or more side wagers may be placed;

determining at least one available side wager opportunity for placing a side wager on game play associated with the first gaming machine; and providing side wager opportunity information to the first side wager, the side wager opportunity information including information relating to the at least one available side wager opportunity.

* * * * *